(12) United States Patent
Zoon et al.

(10) Patent No.: US 10,671,796 B2
(45) Date of Patent: Jun. 2, 2020

(54) ARTICLE AUTHORING, DISTRIBUTION AND RENDERING ARCHITECTURE

(71) Applicant: Apple Inc., Cupertino, CA (US)

(72) Inventors: Pepijn T. Zoon, San Francisco, CA (US); Jean S. Metz, Santa Clara, CA (US); Matthijs Jacob Frederik Zoon, Sunnyvale, CA (US); Mattijs Hoitink, San Jose, CA (US); Douwe H. Homans, Santa Clara, CA (US); Taskin Ahmed Rahman, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 269 days.

(21) Appl. No.: 14/870,483

(22) Filed: Sep. 30, 2015

(65) Prior Publication Data
US 2016/0357711 A1    Dec. 8, 2016

Related U.S. Application Data

(60) Provisional application No. 62/172,154, filed on Jun. 7, 2015.

(51) Int. Cl.
```
G06F 17/00      (2019.01)
G06T 3/40       (2006.01)
G06F 40/106     (2020.01)
G09G 5/00       (2006.01)
G06F 16/957     (2019.01)
```
(Continued)

(52) U.S. Cl.
CPC ............ *G06F 40/106* (2020.01); *G06F 3/017* (2013.01); *G06F 7/08* (2013.01); *G06F 16/9577* (2019.01); *G06F 40/14* (2020.01); *G06F 40/169* (2020.01); *G06F 40/186* (2020.01); *G06F 40/197* (2020.01); *G06T 3/40* (2013.01);
(Continued)

(58) Field of Classification Search
CPC ...................................................... G06F 17/212
USPC ......................................................... 715/229
See application file for complete search history.

(56) References Cited

U.S. PATENT DOCUMENTS

| 6,023,714 | A  | 2/2000 | Hill et al.    |
|-----------|----|--------|----------------|
| 7,788,579 | B2 | 8/2010 | Berkner et al. |

(Continued)

FOREIGN PATENT DOCUMENTS

| WO | WO 2013/138846 | 9/2013 |
| WO | WO 2014/049398 | 3/2014 |

OTHER PUBLICATIONS

Yestrau, "CSS JSON" (2006) available at: http://www.featureblend.com/css-json.html and via archive.org.*

(Continued)

*Primary Examiner* — Ariel Mercado
(74) *Attorney, Agent, or Firm* — Fletcher Yoder PC

(57) ABSTRACT

A novel method of facilitating the authoring of content and the delivery of the authored content to different types of device is provided. The method supports the design of unique and aesthetically pleasing content while minimizes the amount of effort required from authors and/or publishers. The method does so by creating one single content presentation structure (CPS) for the authored content that is adaptable to different devices and different orientations. Such a universally adaptable content presentation structure is based on a standardized grid system that the publishers can easily become familiar with to author their content.

25 Claims, 27 Drawing Sheets

(51) Int. Cl.
*G06F 40/14* (2020.01)
*G06F 40/169* (2020.01)
*G06F 40/186* (2020.01)
*G06F 40/197* (2020.01)
*G06F 7/08* (2006.01)
*G06F 3/01* (2006.01)
*G06T 13/80* (2011.01)

(52) U.S. Cl.
CPC ............. *G06T 13/80* (2013.01); *G09G 5/005* (2013.01); *G06T 2210/22* (2013.01)

(56) References Cited

U.S. PATENT DOCUMENTS

| | | | |
|---|---|---|---|
| 8,078,603 | B1 | 12/2011 | Chandratillake et al. |
| 8,327,262 | B2 | 12/2012 | Tarumi |
| 8,665,294 | B2 | 3/2014 | Hirooka |
| 8,997,021 | B2 | 3/2015 | Liang et al. |
| 9,152,292 | B2 | 10/2015 | Xiao et al. |
| 9,348,801 | B2 | 5/2016 | Oliveira et al. |
| 9,396,167 | B2 | 7/2016 | Doll et al. |
| 9,953,009 | B1* | 4/2018 | Behar .................. G06F 17/212 |
| 2005/0055635 | A1 | 3/2005 | Bargeron et al. |
| 2008/0313659 | A1* | 12/2008 | Eide .................... G06F 17/2247 |
| | | | 719/328 |
| 2009/0208118 | A1* | 8/2009 | Csurka ............... G06K 9/00664 |
| | | | 382/228 |
| 2012/0089669 | A1* | 4/2012 | Berg .................... H04J 3/0667 |
| | | | 709/203 |
| 2014/0068444 | A1 | 3/2014 | Arrasvuori et al. |
| 2014/0229818 | A1 | 8/2014 | Goswami |
| 2014/0258849 | A1 | 9/2014 | Chung et al. |
| 2015/0074518 | A1 | 3/2015 | Rumsey et al. |
| 2015/0095767 | A1 | 4/2015 | Ebner et al. |
| 2015/0381687 | A1* | 12/2015 | Lam .................... G06F 16/9577 |
| | | | 709/246 |

OTHER PUBLICATIONS

Yeh, M., et al., "An Approach to Automatic Creation of Cinemagraphs," MM '12 Proceedings of the 20th ACM International Conference on Multimedia, Oct. 29, 2012, pp. 1153-1156, ACM, New York, USA.

* cited by examiner

```
{
  "version": "0.10",
  "identifier": "SampleArticle",
  "language": "en",
  "title": "Sample Article",
  "subtitle": "A Very Basic Article",
  "layout": {
    "columns": 7,
    "width": 1024,
    "margin": 75,
    "gutter": 20
  },
  "components": [
    {
      "role": "title",
      "text": "A Very Basic Article",
      "textStyle": "title"
    },
    {
      "role": "body",
      "text": "It was a dark and stormy night. Suddenly, a shot rang out!"
    },
    {
      "role": "photo",
      "URL": "bundle://image.jpg"
    }
  ],
  "documentStyle": {
    "backgroundColor": "F7F7F7"
  },
  "componentTextStyles": {
    "default": {
      "fontName": "Helvetica",
      "fontSize": 13,
      "linkStyle": {
        "textColor": "428bca"
      }
    },
    "title": {
      "fontName": "Helvetica-Bold",
      "fontSize": 30,
      "hyphenation": false
    },
    "default-body": {
      "fontName": "Helvetica",
      "fontSize": 13
    }
  }
}
```

*Figure 3*

ARTICLE AUTHORING, DISTRIBUTION AND RENDERING ARCHITECTURE

CLAIM OF BENEFIT TO PRIOR APPLICATIONS

The present application claims the benefit of U.S. Provisional Patent Application 62/172,154, filed Jun. 7, 2015. U.S. Provisional Patent Applications 62/172,154 is incorporated herein by reference.

BACKGROUND

Markup languages have been used by content providers to structure and presenting content for the World Wide Web. Some of these languages (such as HTML5) aim to improve the language with support for the latest multimedia while keeping the language easily readable by humans and consistently understood by computers and devices. Some of the other languages (such as CSS) aim to create visually engaging webpages and user interfaces while separating the document content from the document presentation. However, these markup languages are not immune from device and OS fragmentation, i.e., a content presentation written in these languages are not consistently understood by different computers and devices. In order to create an engaging webpage, its author must have sufficient knowledge of his target device and carefully craft the presentation based on the peculiar capabilities of his target device.

SUMMARY

Some embodiments of the invention provide a novel method of facilitating the authoring of content and the delivery of the authored content to different types of device. The method supports the design of unique and aesthetically pleasing content while minimizes the amount of effort required from authors and/or publishers. In some embodiment, the method does so by creating one single content presentation structure (CPS) for the authored content that is adaptable to different devices and different orientations. In some embodiments, such a universally adaptable content presentation structure is based on a standardized grid system that the publishers can easily become familiar with to author their content.

A content presentation structure (CPS) facilitates content presentation by placing authored contents in structures that can be manipulated and styled for subsequent presentation. For example, in some embodiments, the content is that of a news article, whose text and images are authored or furnished by the publisher. Those authored text and images are placed in component structures of a CPS, upon which additional formatting and styling information can be flexibly applied or specified. In some embodiments, these additional formatting and styling information are added into the CPS structure and can be subsequently modified or further enhanced.

A single CPS can be used by multiple different types of devices and multiple different orientations to present the same authored content. These different types devices may include tablet computers (such as iPad™) and smart phones (such as iPhone™). These different types of devices can have different display sizes and resolutions. A client device may further provide different display sizes at different orientations, such as a wider, shorter horizontal orientation, and a narrower, taller, vertical orientation.

To ensure that the authored content will be presented in a visually pleasing professional manner, regardless of the client device's display size, resolution, and orientation, a client device in some embodiments enforces its own set of design rules. In some embodiments, such rules are enforced when the client device is creating a layout of the presentation according to the internal CPS. In some embodiments, the client device would modify the layout of the presentation according to its design rules.

In some embodiments, a content presentation structure includes different components. Each component has a role in the presentation of the authored content. In some embodiments, each component specifies its own role, and the semantic value or meaning of the specified role is used to determine the eventual presentation of the component. For an authored content delivery system, the semantic value of the role of the component is used by various stages of the system to determine the component's various properties, such as width, height, position, fonts, cropping, color, animation, etc. In some embodiments, components with different roles exhibit different behaviors, while in some embodiments, the same component exhibit different behavior in different devices. Such behaviors differences may include different animation, or behaviors based on different sensors (as different devices may be equipped with different sensors).

In some embodiments, a publisher generates an authored content within an authored CPS and sends the authored CPS to a distribution system. The distribution system performs various processes on the authored CPS to prepare the authored content for presentation at the client devices. Some of these processes use templates to enrich the authored CPS with additional styling/formatting/layout specifications. Some of these processes elaborate various objects in the public CPS and optimizes the result as internal CPS for client devices.

In some embodiments, the publisher or author only needs to specify the authored content as a few components and their corresponding roles. In some embodiments, the distribution system supplies styling and formatting information for those components, specifically based on their roles. In some embodiments, this is accomplished using template CPSs, which supply layout and styling information for components based on their roles.

In some embodiments, a CPS becomes a template CPS when at least some of its properties are "exposed" to be modified (like arguments of a function or procedure call). In some embodiments, these exposed properties can each be given an argument identifier so they can accept new values as arguments or input parameters. A component in an authored CPS can then use these argument identifiers to modify the underlying corresponding set of properties in the template CPS.

In some embodiments, the system stores many template CPSs. For each incoming authored CPS, it is up to the system to identify a suitable template CPS as template. Specifically, a template CPS is a suitable template for a component in an authored CPS only if (i) the role of the template is the same as that of the component in the authored CPS and (ii) the list of arguments (i.e., the argument identifiers of the exposed properties) of the template can be found in the target component.

In some embodiments, a template CPS's role and its set of arguments are jointly referred to as the signature of the template. An authored CPS having the same role and the same property identifiers as the template's set of arguments is a match for the template and vice versa. In some embodiments, the converter in the distribution system encountering an authored CPS would search through its template database for templates with signatures matching that of the authored CPS and apply it to create a richer CPS.

To make a public CPS ready for delivery and presentation, some embodiments perform several more optimization and elaboration operations to create an internal CPS. In some embodiments, these operations introduce additional constructs and syntax that are optimized for machine consumption. In some embodiments, these operations manipulate the structure of CPS in order to make its size smaller. In some embodiments, a client device running a reader application would make requests for internal CPSs based on the article that it is presenting. Once the request is made for an internal CPS, a distribution server delivers the requested internal CPSs to the requesting client device.

Upon receiving an internal CPS, the client device (i.e., its reader application) performs layout operations to determine the area and the position of the various components. For each component, the internal CPS specifies its role, its association, its width, and its horizontal position. These specifications of the components are initial layout specifications for indicating the publisher/author's intent. In some embodiments, these initial layout specifications are specified coarsely by referring to columns. Based on these initial layout specifications, the process determines the actual layout of each component (i.e., its actual shape, size, and position) using a set of device-specific design rules as well as the layouts of other components in the article. The finalized/actual layouts of the components are specified in terms of display points or pixels in some embodiments.

In some embodiments, the layout of the CPS components for a client device is constrained by the design rules of that client device. In some embodiments, the design rule of a client device is specified in accordance with the display dimensions and capabilities of the device. These design rules are enforced to ensure that the resulting blueprint would result in good looking presentations for the specific display dimensions of the client device. These rules are also dependent on the roles of the component.

In some embodiments, the layout of components occurs in an order that is sorted according to the dependencies between the components. To determine such a sorted order, some embodiments create a dependency graph and use the dependency graph to solve for the order by which the layout of components is to follow. In some embodiments, the dependency graph is a list of items, where each item corresponds to either to the size of a component or the position of a component. In some embodiments, the items of the dependency graph are solved by using a stack. The items of the dependency graph are placed in an original, unsorted list. The items in the unsorted list would enter the stack in order. Each item at top of the stack would move on to the sorted/solved list if it has no dependency or if all of its dependencies are already in the sorted/solved list. Conversely, an item having dependencies to items in the unsorted original list would stay in the stack (and have other items pushed on top of it) until all of its dependencies have moved onto the sorted/solved list and it is on top of the stack.

Some embodiments perform clipping to remove parts of the image so the remainder will fit the layout of the component while showing what is relevant to the subject matter as intended by the author. Some embodiments perform image clipping so the resulting image will comply with the image component's size and shape as specified in the blueprint (i.e., as determined by the layout generator based on the device-specific design rules). Furthermore, some embodiments determines the region of the image to crop by identifying a region of interest in the image data based on the role of the component as specified by the CPS.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the invention are set forth in the appended claims. However, for purpose of explanation, several embodiments of the invention are set forth in the following figures.

FIG. 3 illustrates an example CPS written in JSON.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a novel method of facilitating the authoring of content (or document) and the delivery of the authored content to different types of device. The method supports the design of unique and aesthetically pleasing content while minimizes the amount of effort required from authors and/or publishers. In some embodiment, the method does so by creating one single content presentation structure (CPS) for the authored content that is adaptable to different devices and different orientations. In some embodiments, such a universally adaptable content presentation structure is based on a standardized grid system that the publishers can easily become familiar with to author their content.

Figure 1:
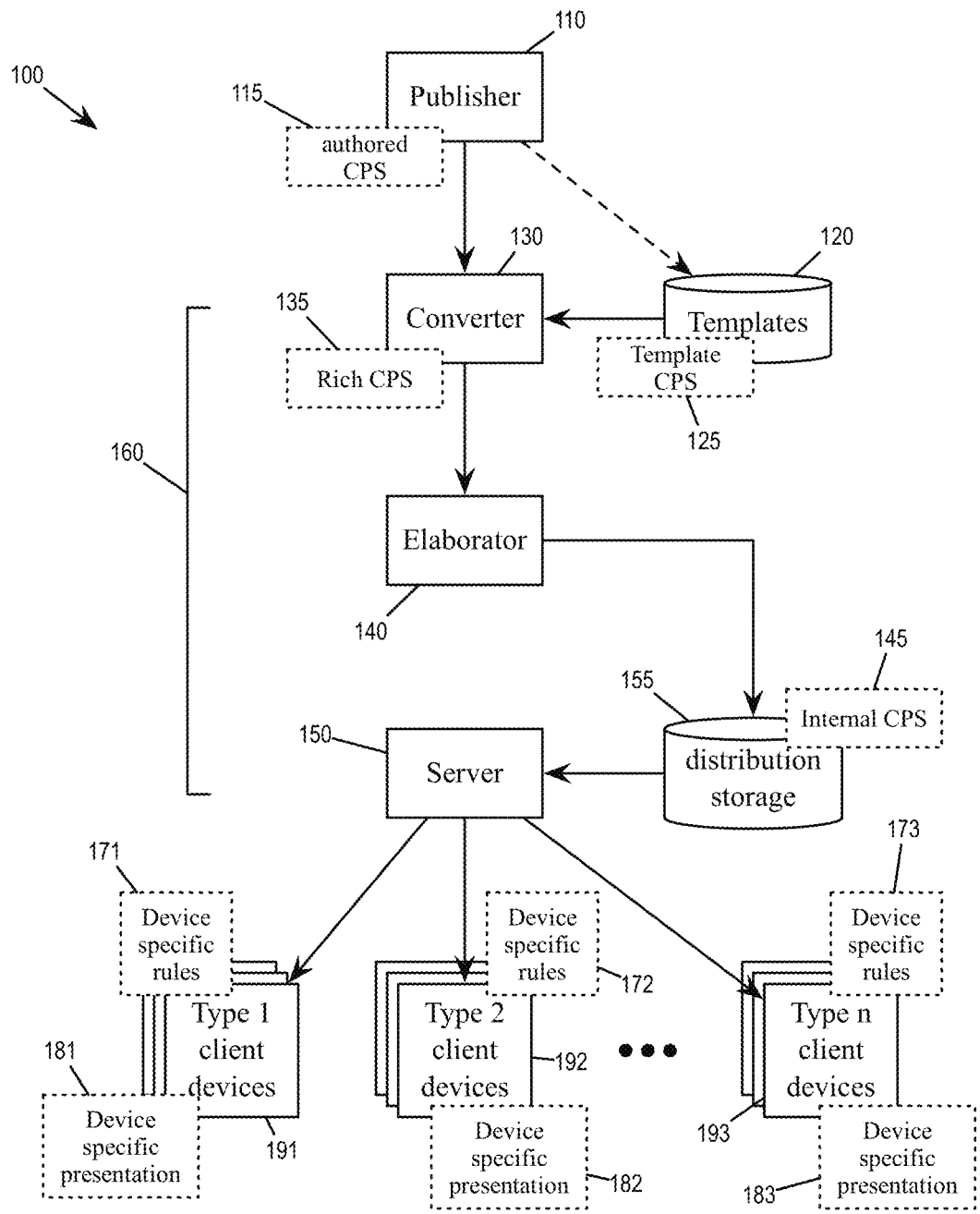
FIG. 1 illustrates an authored content delivery system that generates one single content presentation structure for presenting a piece of authored content at multiple devices and or multiple orientations.

FIG. 1 illustrates an authored content delivery system 100 that generates one single content presentation structure for presenting a piece of authored content at multiple devices and or multiple orientations. The system 100 receives the piece of authored content in a content presentation structure from a publisher 110 and processes it in preparation for distribution. The processed content presentation structure is distributed to client devices 191-193 of different types. Different types of devices have different capabilities (e.g., display resolutions, user input interfaces, available sensors) and will present the content differently based on its own design rules.

As illustrated, the authored content delivery system 100 includes several participants. Those include a publisher 110, a template storage 120, a converter 130, a distribution storage 155, a distribution server 150, and the client devices 191-193.

The publisher 110 authors its content in an authored CPS 115 and provides it to the converter 130. The converter 130 combines the authored CPS 115 with a matching template CPS 125 provided by the template storage 120 to produce an enriched CPS 135. An elaborator 140 elaborates and optimizes the enriched CPS 135 into an internal CPS 145, which is stored at the distribution storage 155 for subsequent distribution. The server 150 retrieves the internal CPS 145 and delivers it to the client devices 191-193. Each of the client devices 191-193 creates its own device-specific presentation (e.g., 181 of the client device 191) from the delivered internal CPS 145 based on its own device-specific design rules (e.g., 171 of the client device 191).

In some embodiments, each of these system participants is implemented by one or more computing devices. These computing devices perform the data generation and data processing operations of the authored content delivery system 100, starting from the creation of the authored CPS 115 by the publisher 110 to the device-specific presentations 181-183 at the devices 191-193. In some embodiments, each client device is running a reader application for processing the received internal CPS and for making the presentation of the authored document.

The publisher 110 is the originator or the author of the content that is to be ultimately presented at the various devices 191-193. A publisher is an entity that engages in the production and dissemination of content such as music, movie, literature, books, magazine, news, or other types of information to the public. Such an entity can be a corporation, a group of artists, an individual author, etc. that have the capabilities to create (author) and disseminate the content through the authored content delivery system 100. In some embodiments, the publisher possesses the necessary computing and communications means (e.g., a computing device having access to Internet) to place the content that it produces in a form of a content presentation structure (i.e., the authored CPS 115) and delivers that content to the authored content delivery system 100.

A content presentation structure (CPS) facilitates content presentation by placing authored contents in structures that can be manipulated and styled for subsequent presentation. For example, in some embodiments, the content is that of a news article, whose text and images are authored or furnished by the publisher. Those authored text and images are placed in component structures of a CPS, upon which additional formatting and styling information can be flexibly applied or specified. In some embodiments, these additional formatting and styling information are added into the CPS structure and can be subsequently modified or further enhanced. The presentation of the content can include text, images, animation, audio, video, multimedia, braille, or other types of visual, auditory, or other sensory experiences that can be made by a computing device. The presentation of the content also includes behaviors exhibited by various components as specified by the CPS.

The authored CPS 115 is the CPS that is produced by the publisher 110 as the input to the authored content delivery system 100. In some embodiments, the publisher or author places its/his/her created content in the authored CPS 115 while specifying very little formatting and styling information (or none at all). In some embodiments, the authored CPS 115 does not specify any information that is specific to any presentation devices (191-193). This is because one of the goals of the invention is for the publishers/authors to only focus on the actual content, without spending much time or energy on styling, formatting, or the peculiarities of the individual presentation devices. However, in some embodiments, the publisher 110 is free to generate authored CPSs that have very rich styling and layout information.

The template storage 120 stores various template CPSs. Unlike a typical authored CPS, a typical template CPS have rich styling and formatting information for a specific appearance that can be repeatedly applied to different content. In some embodiments, the publisher 110 or a third party vendor creates various templates for various desired presentation formats and upload them to be stored at the template storage 120 (through a portal webpage on the Internet, for example). A template CPS can be applied to an authored CPS to create an enriched CPS that has the content of the authored CPS and the styling/formatting of the template CPS. As illustrated, the converter 130 converts the authored CPS 110 into the rich CPS 135 by applying the template CPS 125. The use of templates to enrich the formatting and styling of an authored content will further described in Section II.a below.

The elaborator 140 is for preparing the content for distribution. For a piece of content (e.g., a magazine or news article), the elaborator 140 prepares it for distribution by the server 150 by converting the enriched CPS 135 into the internal CPS 145. In some embodiments, the internal CPS is an elaborated version of the enriched CPS (or authored CPS) that is optimized for delivery to the client devices. The generation of internal CPS will be further described in Section II.b below. Once an internal CPS is created, it is stored in the distribution storage 155. The server 150 in turn retrieves the internal CPSs stored in the distribution storage 155 for distribution to the client devices 191-193.

In some embodiments, the converter 130 and the elaborator 140 are performed by one conversion process that receives the authored CPS 115, applies the template CPS 125 from the template storage 120 to create the rich CPS 135, and then elaborates/optimizes the rich CPS 135 into the internal CPS 145. In some embodiments, this conversion process converts the authored CPS directly into its corresponding internal CPS without enriching it by applying a template CPS.

In some embodiments, the template storage 120, the converter 130, the elaborator 140, the distribution storage 155, and the server 150 are parts of a distribution sub-system 160. In some embodiments, the various parts of the distribution sub-system 160 are located at one location. In some embodiments, they are different components of a single computing device, and/or different processes performed by a same computing device. In some embodiments, the template storage 120 and the distribution storages are cloud storages, while the converter 130, the elaborator 140, and the server 150 are computing resources distributed across different physical locations as part of the cloud.

Each of the client devices 191-193 receives the internal CPSs distributed by the server 150. In some embodiments, a client device requests specific internal CPSs based on the application that it is running. For example, in some embodiments, the client device is running a reader application that is presenting news or magazine articles. The reader application causes the client device to request the corresponding internal CPSs from the server 150. The client device then uses the requested internal CPSs to form the presentation of the article. In some embodiments, the client device creates a layout of the presentation according to the internal CPS and then renders the layout (called a blueprint in some embodiments) for display by the reader application.

As mentioned, a single CPS can be used by multiple different types of devices and multiple different orientations to present the same authored content. These different types devices may include tablet computers (such as iPad™), smart phones (such as iPhone™), laptop computers, or desktop computers. These different types of devices can have different display sizes and resolutions. A client device may further provide different display sizes at different orientations, such as a wider, shorter horizontal orientation, and a narrower, taller, vertical orientation.

To ensure that the authored content will be presented in a visually pleasing professional manner, regardless of the client device's display size, resolution, and orientation, a client device in some embodiments enforces its own set of design rules (e.g., device specific rule 171 for the client device 191). In some embodiments, such rules are enforced when the client device is creating a layout of the presentation according to the internal CPS. The operations of a client device will be further described in Section III and Section IV below.

Several more detailed embodiments of the invention are described below. Section I describes using content presentation structures to specify the presentation of an authored document. Section II describes preparing a content presentation for distribution by server. Section III describes layout generation from content presentation structure. Section IV describes different types of behavior in a presentation of the authored document that are specified by CPS. Section V describes an electronic system with which some embodiments of the invention are implemented.

I. Content Presentation Structure

As mentioned, to facilitate the presentation of an authored content across different platforms in different devices, some embodiments store the authored content in content presentation structures (CPSs). In order to present the authored content in a professionally looking manner of a newspaper or magazine article, a CPS may also specify how the authored document should be presented by including formatting and styling information.

In some embodiments, a content presentation structure includes different components. Each component has a role in the presentation of the authored content. For example, one text component of the CPS may correspond to the title of the authored content, while another text component may correspond to bodytext of the authored content. One image may correspond to the portrait of the author, while another image may correspond to a logo of a company, so on and so forth. In some embodiments, each component specifies its own role, and the semantic value or meaning of the specified role is used to determine the eventual presentation of the component. For the authored content delivery system 100, the semantic value of a component's role is used by various stages of the system to determine the component's various properties, such as width, height, position, fonts, cropping, color, animation, etc.

Figure 2:
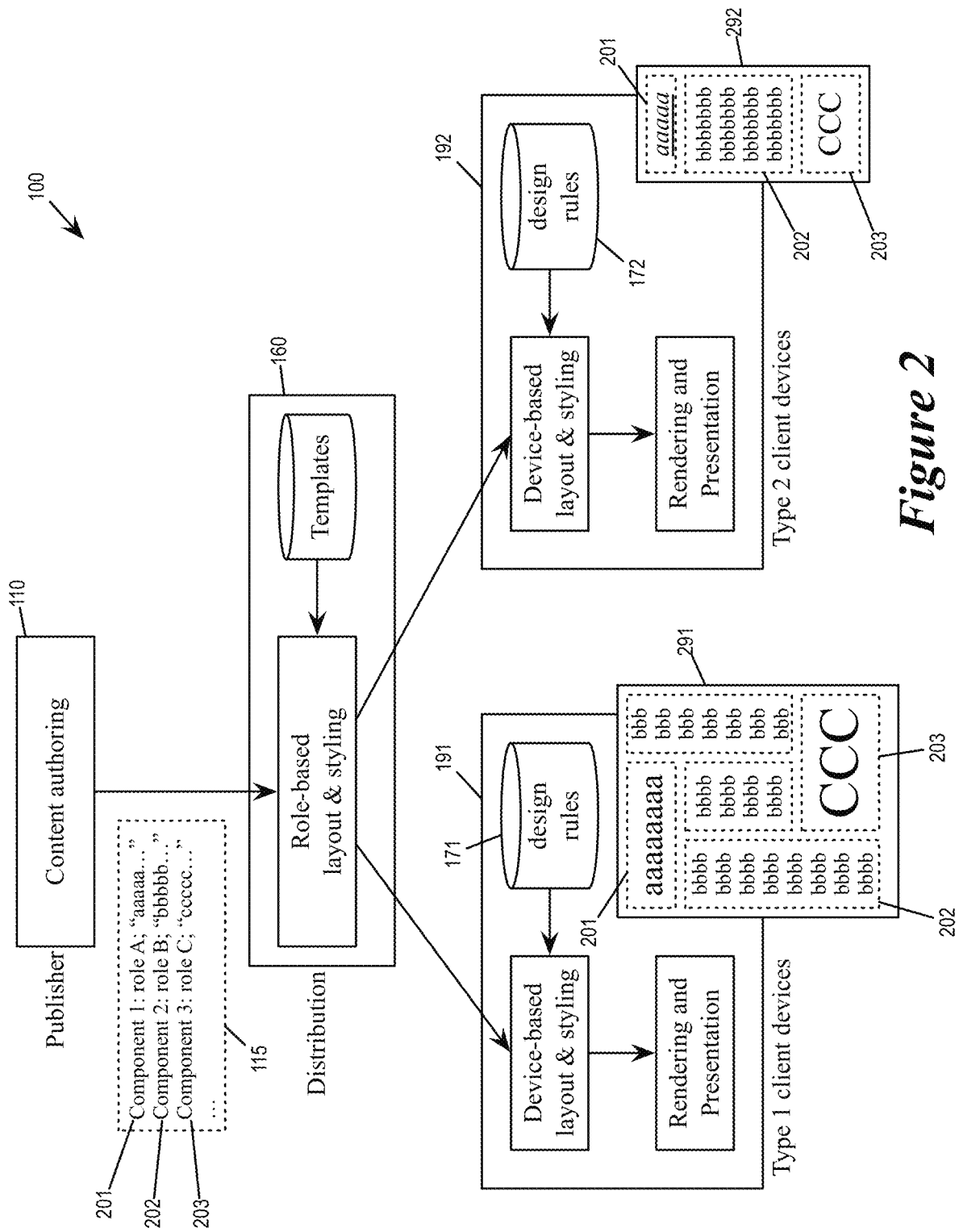
FIG. 2 conceptually illustrates the presentation of authored content based on CPS.

FIG. 2 conceptually illustrates the presentation of authored content based on CPS. Specifically, the figure shows how roles of components determine the presentation of the authored content at the different client devices. The figure shows various blocks that performs various operations in the authoring, distribution, and presentation of authored content in some embodiments of the invention. These blocks represents operations performed by the various participants of the authored content delivery system 100.

As illustrated, the publisher 110 performs content authoring operation to create an authored CPS 115. The authored CPS 115 includes various components, including 201-203 ("component 1", "component 2", and "component 3"). Each of these components has a role. The role of the component 201 is "role A". The role of the component 202 is "role B". The role of the component 203 is "role C", etc. The content of the component 201 is the text "aaaaa . . . ". The content of the component 202 is the text "bbbbb . . . ". The content of the component 203 is the text "ccccc . . . ".

The authored CPS 115 is passed to the distribution sub-system 160, which performs layout, formatting, and styling to the various components in the CPS. In some embodiments, performing layout, formatting, and styling to a component entails identifying suitable templates based on component's role. For example, for a component having the role of "header", the distribution system 160 would identify or select a template that is made for components having the role of "header".

The role-based layout and styling operations are part of the operations that the distribution system 160 performs when preparing the authored content for distribution (i.e., to produce the internal CPS 145). The results of these role-based operations are distributed to client devices 191 and 192. Each of the client devices in turn use its own set of design rules to perform device-based layout and styling, then rendering and actual presentation. Some of these device-based layout and styling are also role-based, i.e., the client device applies different device design rules to components with different roles.

FIG. 2 illustrates a presentation 291 by the client device 191 and an example presentation 292 by the client device 192. Both of these presentations are derived from the same authored CPS 115, but are ultimately fashioned by different design rules tailored for different devices. As illustrated, the presentation 291 is for a larger display (such as a tablet device), while the presentation 292 is for a smaller display (such as a smart phone). Both presentations show components 201-203, with their corresponding contents "aaaa . . . ", "bbbbb . . . ", and "ccccc . . . ". With each presentation, components with different roles have different the appearance (e.g., layout, fonts). Furthermore, the device 191 may present a same component differently than the device 192. As illustrated, the presentation 291 uses a different font for component 201 than the presentation 292 for the component 201. The presentation 291 presents the text of the component 202 in three columns, while the presentation 292 presents the same in just one column. The presentation 291 has a larger layout for the component 203 that spans three columns, while the presentation 292 has a smaller layout of the component 203 that spans just one column.

Though not illustrated, in some embodiments, components with different roles exhibit different behaviors, while in some embodiments, the same component exhibit different behavior in different devices. Such behavior differences may include different animation, different user interaction, different user inputs, or different sensor inputs.

In some embodiments, a content presentation structure is written in a content presentation structure language (CPSL). In some embodiments, the CPSL leverages the constructs and syntax of JavaScript Open Notation (JSON) language. In some embodiments, a CPS written in such a CPSL is considered a "native document" to the authored content delivery system 100 as the syntax of the CPSL is optimized to utilize the inherent capabilities of the system.

FIG. 3 illustrates an example CPS 300 written in JSON. The CPS is that of an authored document that includes a title, a body text, and a photo of an article. As illustrated, the JSON CPS at its top level includes a set of identifying information 310. It also includes several styling and formatting instructions for the top level, including a set of layout instructions 321 and a set of font definitions 322. The CPS 300 is structured into several components 301-303. The component 301 has the role "title" and is for presenting the title of the article. The component 302 has the role "body" and is for presenting the body text of the article. The component 303 has the role "photo" and is for presenting a photo for the article.

A component of a CPS may have a set of properties in addition to the component's role. Each property has a property identifier and is assigned a value. For example, the component 301 has a set of properties 311-312. The identifier of the property 311 is "text", and its value is "A Very Basic Article". The identifier of the property 312 is "textStyle", and its value is "title". Likewise, the top level component of the CPS 300 has even more properties, properties with identifiers such as "layout", "documentStyle", and "componentTextStyles", each of which has its own set of values or nested properties. In some embodiments, components can be nested under other components. In the example of FIG. 3, the components 301-303 are components nested under the top level components. Though not illustrated, each of those components can have its own nested components underneath.

As mentioned above by reference to FIG. 2, a role of a component determines how the component is presented. It can also be said that the role determines the behavior of the component in the presentation. In some embodiments, the behavior of a component is how it visually appears in the presentation, such as its layout, the font it uses, its position, its animation, etc. In some embodiments, the role of a component as specified by the CPS has semantic value that can be used for other purposes, such as for keyword for search engines.

Figure 4:
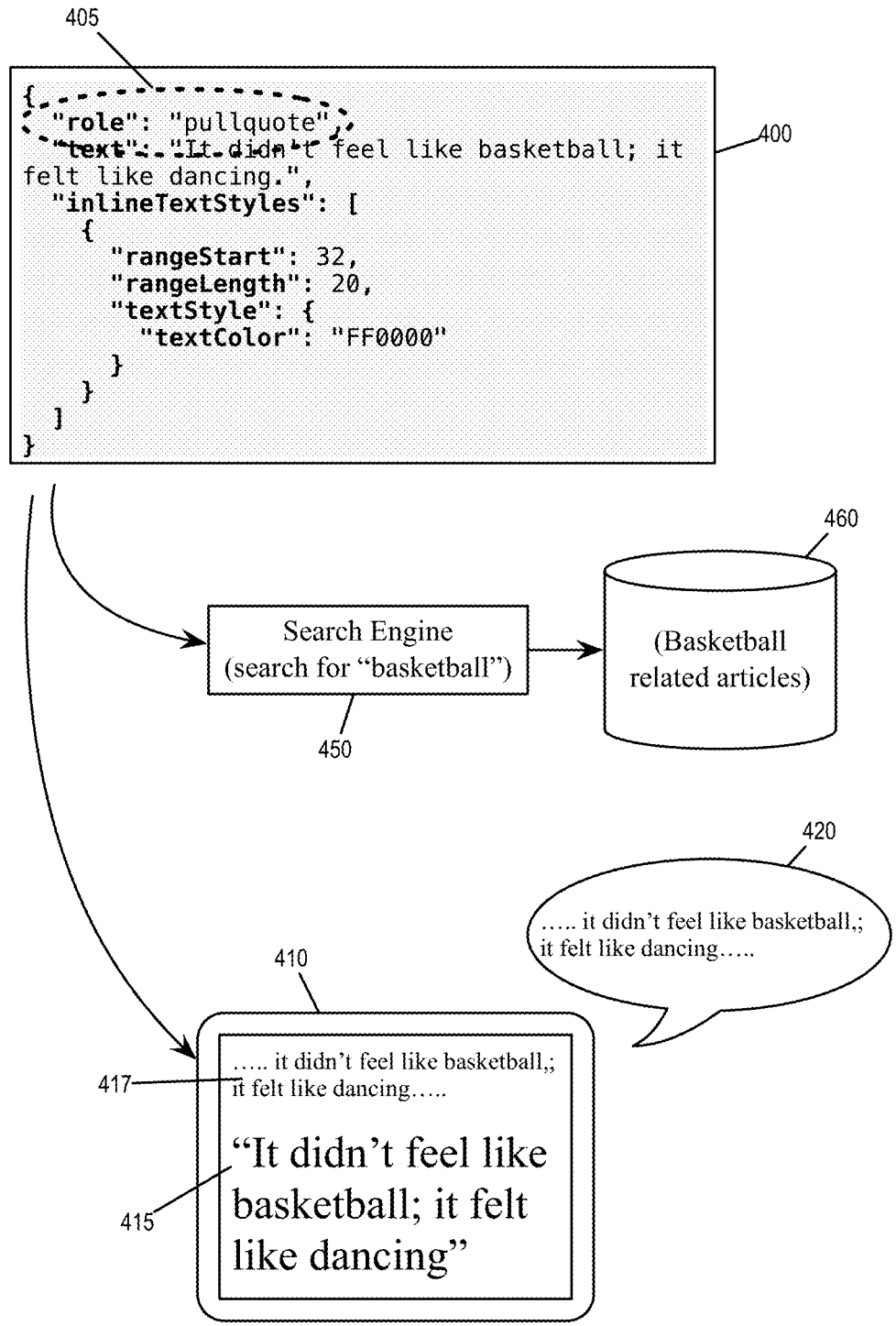
FIG. 4 illustrates several example behaviors of a component that are determined by the component's role.

For some embodiments, FIG. 4 illustrates several example behaviors of a component that are determined by the component's role. The figure illustrates an article 400 having a component 405 in its CPS whose role is "pullquote". A pullquote is a key phrase, quotation or excerpt that has been "pulled" from an article and used as a graphic element, serving to entice readers into the article or to highlight a key topic. It is typically placed in a larger or distinctive typeface and on the same page. Generally speaking, its content is a repeat of what is already present in the body of the article.

FIG. 4 illustrates several different example behaviors of the component 405 that are due to the role specification "pullquote". As illustrated, the component 405 is visually displayed on a device 410 as pullquote 415, i.e., as an emphasized excerpt or repeat of some text 417 in the body of the article 400. However, when the article 400 is audibly presented in an audio presentation 420, the pullquote component 405 will be omitted from the audio presentation, since it is mere repeat of what has already been read so can be bothersome to the reader.

Since pullquote often reveals the emphasis of the article, a CPS component having the role "pullquote" is used by some embodiments to identify keywords related to the article. In this example, the content of the pullquote component 405 is "it didn't feel like basketball; it felt like dancing". Consequently, a search engine 450 would identify the article 400 as being an article relevant to the search term "basketball" in search result 460.

The CPS language in some embodiments defines many different roles having semantic values that can be used to determine the behaviors of components when the CPS is presented. Some of these roles are for image components (e.g., "photo", "logo", "figure", "portrait"), some for text components (e.g., "body", "caption", "pullquote", "header", "title", "heading"), some for advertisement (e.g., "banner_advertisement", "medium_rectangle_advertisement"), still others such as "audio", "instagram", "tweet", "video", "music", "mosaic", so on and so forth.

II. Pre-Processing for Distribution

As mentioned above by reference to FIG. 1, a publisher generates an authored content within an authored CPS and sends the authored CPS to a distribution system. The distribution system performs various processes on the authored CPS to prepare the authored content for presentation at the client devices. Some of these processes use templates to enrich the authored CPS with additional styling/formatting/layout specifications. Some of these processes elaborate various objects in the public CPS and optimizes the result as internal CPS for client devices.

a. Templating

In some embodiments, an authored CPS has very few required elements. To create a professional looking article through the authored content delivery system, the publisher or the author need only to specify the authored content as a few components and their corresponding roles. In some embodiments, the distribution system supplies styling and formatting information for those components, specifically based on their roles. In some embodiments, this is accomplished using template CPSs, which supply layout and styling information for components based on their roles.

Figure 5:
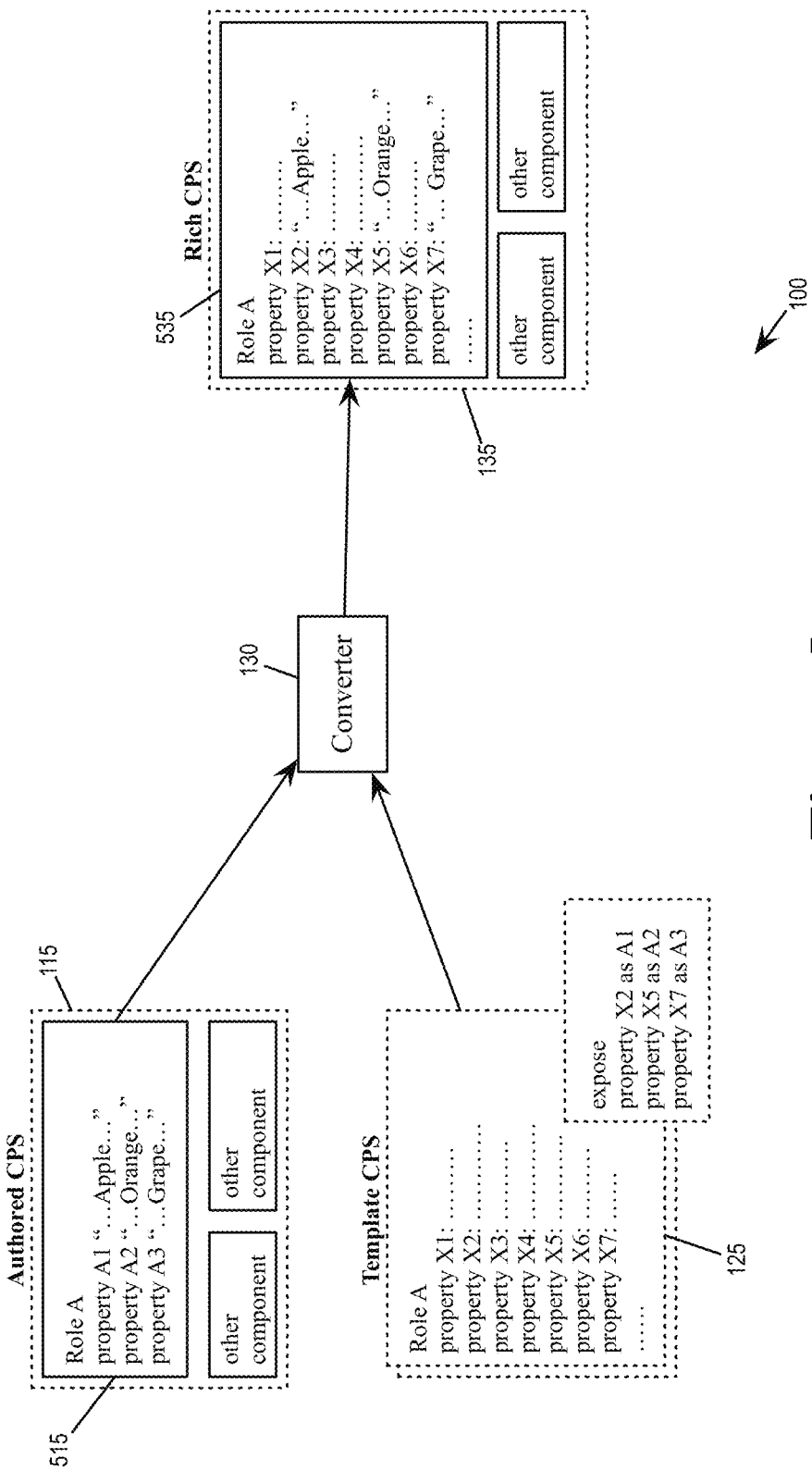
FIG. 5 illustrates using templates to supply layout and styling information to components of authored CPSs.

FIG. 5 illustrates using templates to supply layout and styling information to components of authored CPSs. Specifically, the figure illustrates the converter 130 enriching the authored CPS 115 with formatting and styling information of the template CPS 125 to create the rich CPS 135.

The template CPS 125 has the role "Role A". It is however far richer in information. As illustrated, the template CPS 125 has properties with identifiers X1 through X7. Among these, the properties X2, X5, and X7 are "exposed" as A1, A2, and A3, respectively. This means that when the template 125 is applied to a component with properties (whose identifiers are) A1, A2, and A3, the value of the property A1 will be assigned to be the value of the property X2 in the template, the value of the property A2 will be assigned to be the value of the property X5 in the template, and the value of the property A3 will be assigned to be the value of the property X7 in the template.

The authored CPS 115 includes several components, one of which, the component 515, has the role "Role A". It also has properties with identifiers A1, A2, A3, whose values are "Apple", "Orange", and "Grape", respectively. The converter 130 applies the template 125 to the component 515, thereby creating an enriched component 535 in the rich CPS 135. As illustrated, the enriched component 535, like the template CPS 125, also has properties X1 through X7. However, the values of the properties X2, X5, and X7 has been set to be the values of the properties A1, A2, and A3 in the component 515. Specifically, the value of the property X2 is now "Apple", the value of the property X5 is now "Orange", and the value of the property X7 is not "Grape".

In some embodiments, a template CPS is really a CPS of an authored document that is verified to provide professional looking outcome. The publisher can collect such rich CPSs and provide them as template CPSs. In some embodiments, a CPS becomes a template CPS when at least some of its properties are "exposed" to be modified (like arguments of a function or procedure call). In some embodiments, these exposed properties can each be given an argument identifier so they can accept new values as arguments or input parameters, such as when the properties X2, X5, and X7 being exposed as arguments A1, A2, and A3. A component in an authored CPS can then use these argument identifiers to modify the values of the underlying corresponding set of properties in the template CPS.

Figure 6:
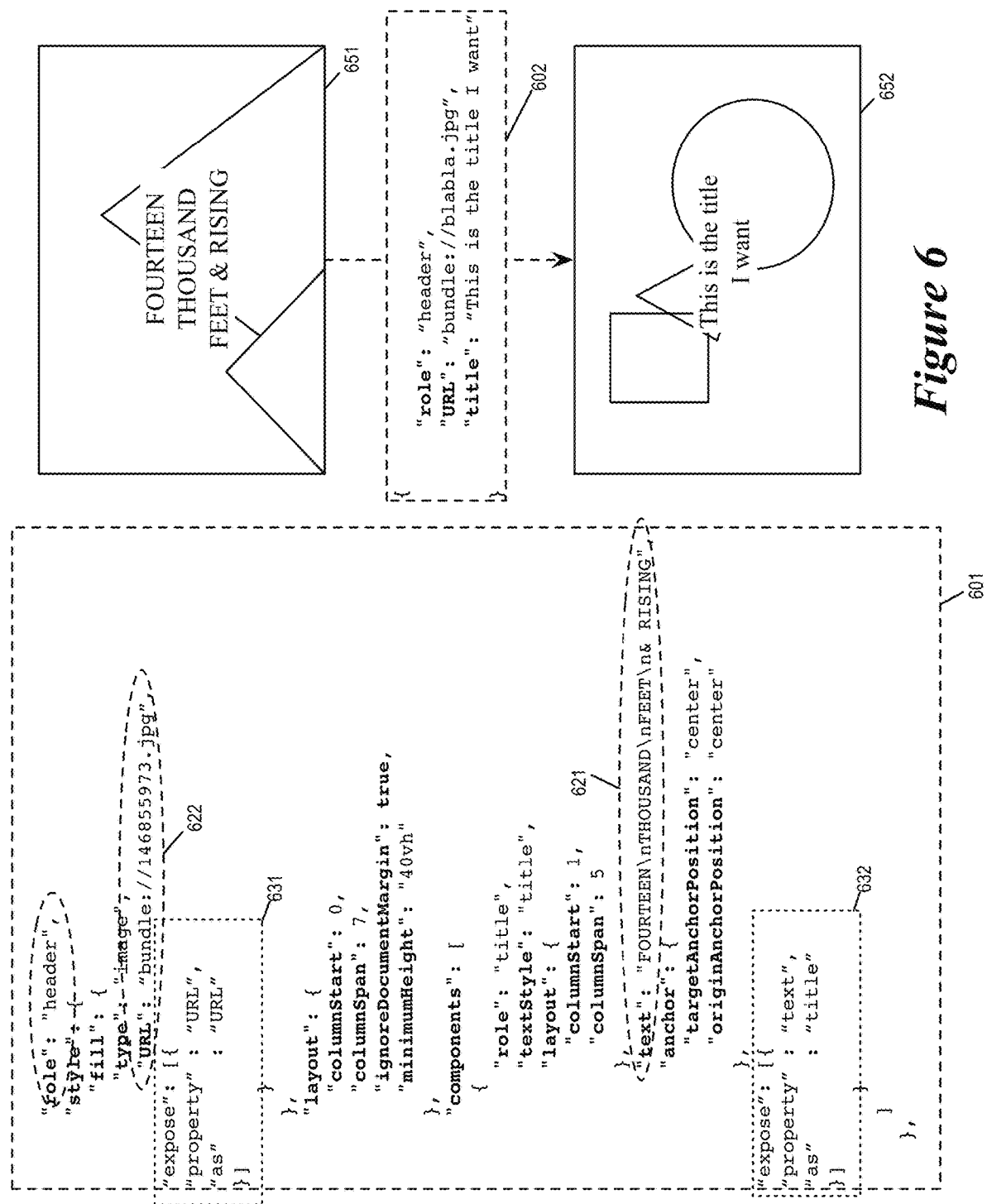
FIG. 6 illustrates a JSON based example of using a rich CPS as template by exposing some of its properties as arguments so it can be reused by another authored content.

FIG. 6 illustrates a JSON based example of using a rich CPS as template by exposing some of its properties as arguments so it can be reused by another authored content. The figure illustrates two JSON CPSs 601 and 602. The JSON CPS 601 is rich in layout and styling information. The figure illustrates a corresponding presentation 651 for the JSON CPS 601 when it is not being used as a template. The appearances of objects (fonts, text position, size of text box, background image, etc.) are exactly as specified by the JSON CPS 601. It displays a text in center that says "FOURTEEN THOUSAND FEET & RISING", which is specified by a property "text" (621). It also displays a background image from the URL "bundle://146855973.jpg" that is specified by a property "URL" (622). The property "URL" is exposed as argument "URL" (at 631) (the argument identifier can be the same as the underlying property) and the property "text" is exposed as argument "title" (at 632).

The JSON 602 is a barebones authored CPS and contains virtually no information other than the authored content itself. In these cases, the JSON 602 includes just a component with a role definition ("header"), a reference to an image, and a title. The reference to the image is specified by a property "URL" whose value is "bundle://blabla.jpg". The title is specified by a property "title", whose value is "This is the title I want".

When the converter applies the JSON 601 as template to the JSON 602, the value of the property "URL" and the value of the property "title" in the JSON 602 are passed into the JSON 601, modifying the values of their corresponding exposed properties ("URL" and "title"). Specifically, the value "bundle://blabla.jpg" passes through the argument "URL" to become the value of the property "URL" in JSON 601, and the value "This is the title I want" passes through the argument "title" to become the value of the property "text" in JSON 601. The rich CPS thus created results in a corresponding presentation 652. The background image and the text in the center of the presentation 652 are as specified by the barebones JSON 602, but the other characteristics of the presentation (e.g., the fonts, the layout, the position, the color, etc.) are all specified by the rich template JSON 601.

In some embodiments, the system stores many template CPSs. For each incoming authored CPS and the components therein, it is up to the system to identify a suitable template CPS as the template. Specifically, a template CPS is a suitable template for a component in an authored CPS only if (i) the role of the template is the same as that of the component in the authored CPS and (ii) the list of arguments (i.e., the argument identifiers of the exposed properties) of the template can be found in the target component. In the example of FIG. 6, the JSON 601 is a suitable template for the component in the JSON 602 because the arguments from exposed properties of JSON 601 ("URL" and "title") matches the properties of the JSON 602, and the role of the template JSON 601 ("header") also matches that of JSON 602.

In some embodiments, a template CPS's role and its set of arguments are jointly referred to as the signature of the template. An authored CPS (or a component therein) having the same role and the same property identifiers as the template's set of arguments is a match for the template and vice versa. In some embodiments, the converter in the distribution system encountering an authored CPS would search through its template database (e.g., the template storage 120) for templates with signatures matching that of the authored CPS and apply it to create a richer CPS.

Figure 7:
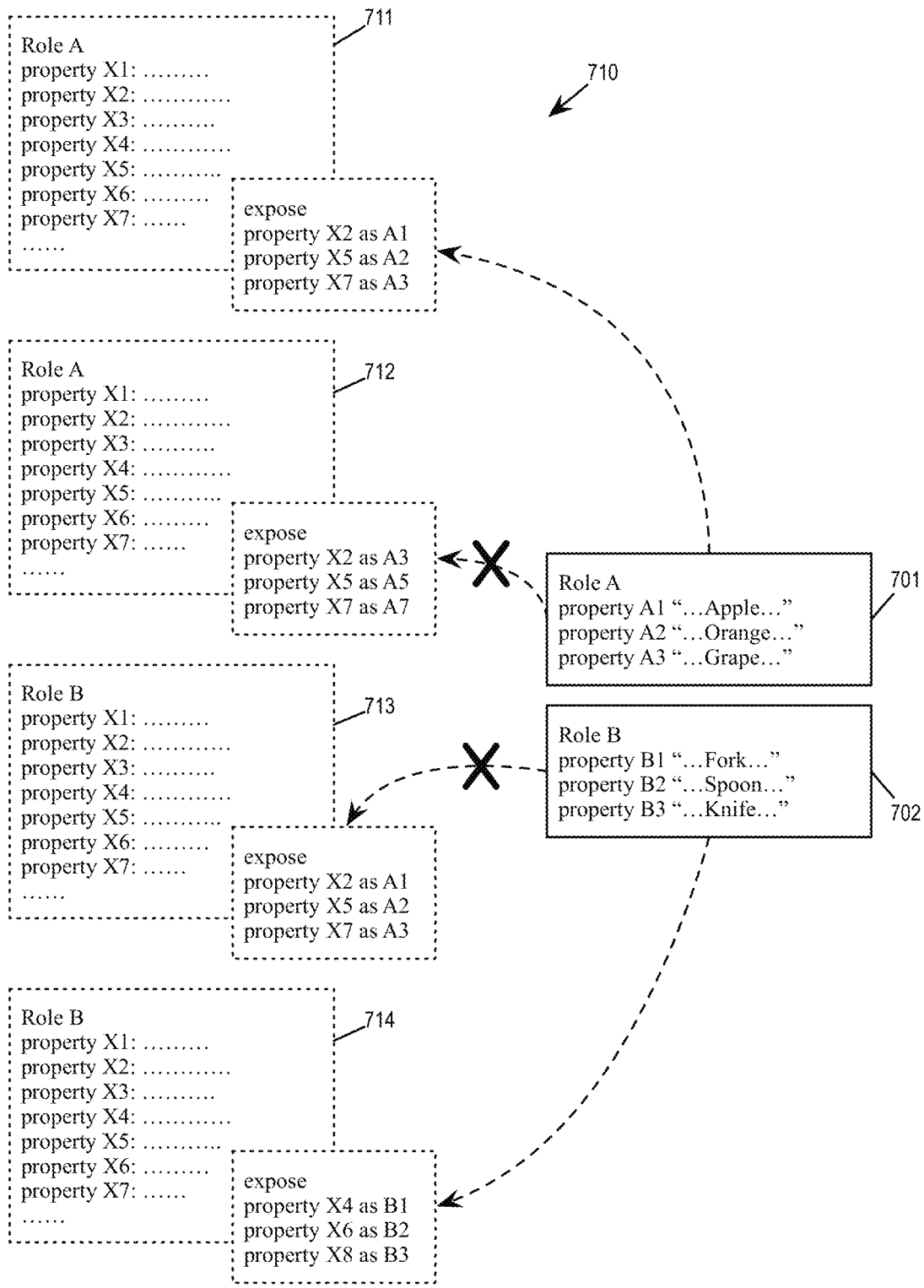
FIG. 7 illustrates two example template signature matching operations for two example authored CPSs.

FIG. 7 illustrates two example template signature matching operations for two example authored CPSs 701 and 702. The CPS 701 has the role "role A" with properties A1, A2, and A3, while the CPS 702 has the role "role B" with properties B1, B2, and B3. The figure also shows a template database 710 with at least four different templates 711-714. The template 711 has the role "role A" and exposes properties X2, X5, and X7 as arguments A1, A2, and A3. The template 712 also has the role "role A" and exposes properties X2, X5, and X7 as arguments A3, A5, and A7. The template 713 has the role "role B" and exposes properties X2, X5, and X7 as arguments A1, A2, and A3. The template 714 has the role "role B" and exposes properties X4, X6, and X8 as arguments B1, B2, and B3.

For the CPS 701, only the template 711 is identified as a matching template for having the matching signature. Other templates either have the wrong role (e.g., templates 713 and 714 have "role B" instead of "role A") or the wrong list of arguments (e.g., templates 712 and 714). Likewise, for the CPS 702, only the template 714 is identified as a matching template for the CPS 702 for having the same role and the same list of arguments.

In some embodiments, it is possible to have multiple matching templates for a component of an authored content. In such instances, some embodiments randomly select and apply one of the matching templates, or rotate the matching templates to provide a variety of appearances or behaviors.

Figure 8:
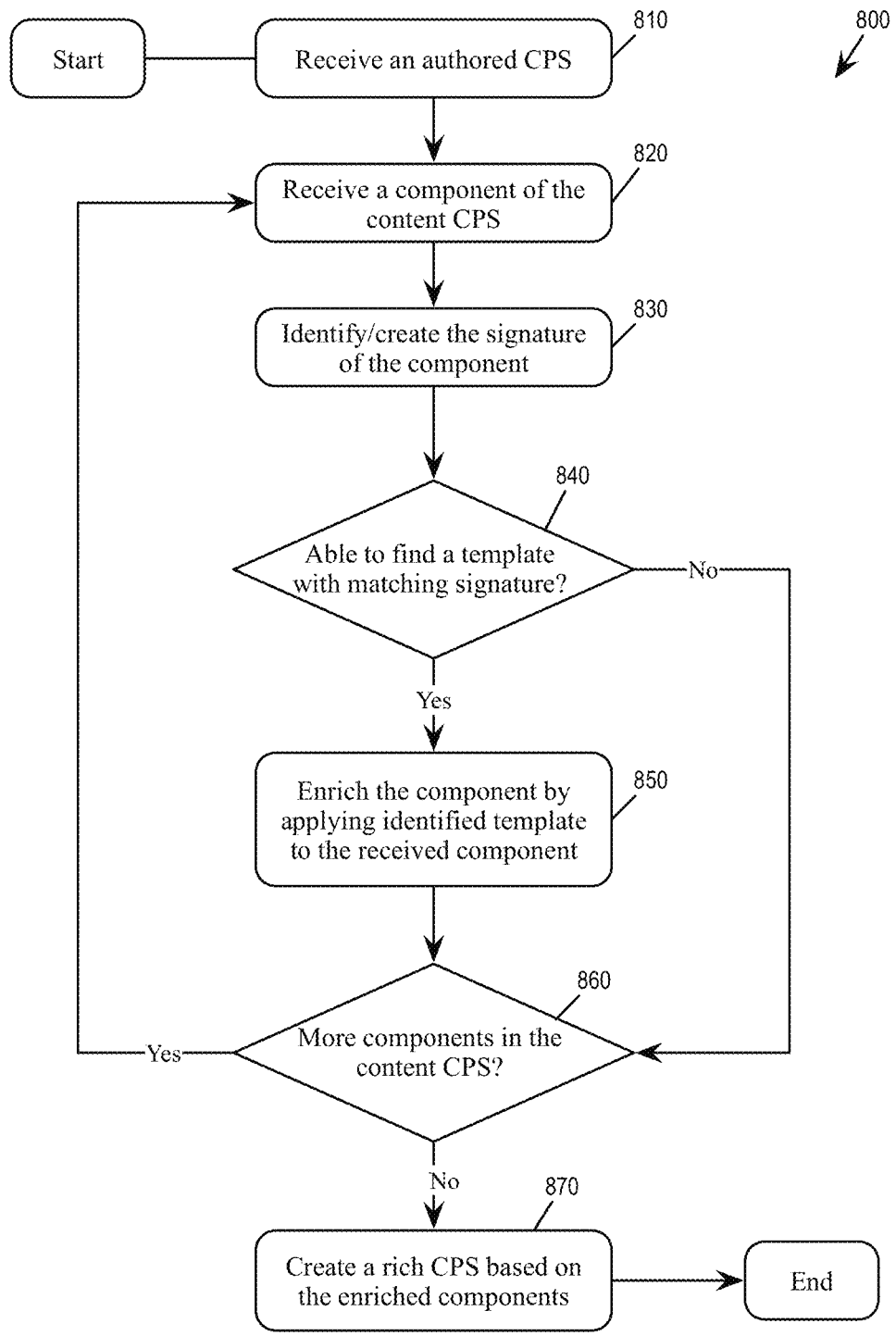
FIG. 8 conceptually illustrates a process for identifying and using templates to create a rich CPS for an authored content presentation.

For some embodiments, FIG. 8 conceptually illustrates a process 800 for identifying and using templates to create a rich CPS for an authored content presentation. In some embodiments, the process is performed by a converter (e.g., the converter 130) in the distribution sub-system 160. The process starts when it receives (at 810) an authored CPS with authored content, which can have very little or no formatting and styling information. The authored CPS has a set of properties that can be used to create a signature for identifying a matching template CPS.

The process then receives (at 820) a component in the authored CPS. In some embodiments, the process applies templates to an authored CPS on a component by component basis, i.e., the process would identify a template for each of the components in the authored CPS. The process then identifies (at 830) a signature for the component for the purpose of identifying a template. In some embodiments, the signature is based on the role of the component and the properties defined for the component.

Next, the process determines (at 840) whether it is able to find a matching template (i.e., a template with the matching signature) for the component. If so, the process proceeds to 850. If not, the process proceeds to 860. Signature matching is described by reference to FIG. 7 above.

At 850, the process enriches the component by applying the identified template to the component. In some embodiments, the process does so by passing the values of properties in the component to the corresponding exposed properties of the template, i.e., to modify the values of the exposed properties with the values from the component of the authored CPS. This operation is described by reference to FIGS. 5 and 6 above.

At 860, the process determines whether there are more components in the authored CPS that has yet to go through template matching. If so, the process returns to 820 to identify a next component in the authored CPS. If not, the process proceeds to 870 to create a rich CPS by combining the authored CPS with its identified matching template CPS. The process 800 then ends.

b. Generating Internal CPS

In some embodiments, the authored CPS 115, the template CPS 125, and the enriched CPS 135 are considered "public" because they are "open" to the users to be modified, stored, and reused. They are written in syntax elements that are documented for human comprehension and manipulation. In some embodiment, they do not refer to low level parameters or constructs for specific device types and are not optimized for delivery to the client devices. To make the public CPS ready for delivery and presentation, some embodiments perform several more optimization and elaboration operations. In some embodiments, these operations introduce additional constructs and syntax that are optimized for machine consumption. In some embodiments, these operations manipulate the structure of CPS in order to make its size smaller. The results of these operations are often not intended for human comprehension or manipulation. The resulting CPS is therefore referred to as "internal" CPS, as it is a CPS that is not open to the public.

Though different types of client devices have their own set of design rules and ultimately require processing that are device-type specific, many of the processing needed for making a CPS ready for presentation are common to all possible client devices. In some embodiments, many or all of these common operations are performed by the distribution sub-system (i.e., 160) during the generation of the internal CPS and before distribution to the client devices themselves. In some embodiments, the creation of the internal CPS also entails performing some operations intended for specific types of devices, because it is more efficient that those operations be performed once at the distribution system rather than being performed on every device of the type.

Figure 9:
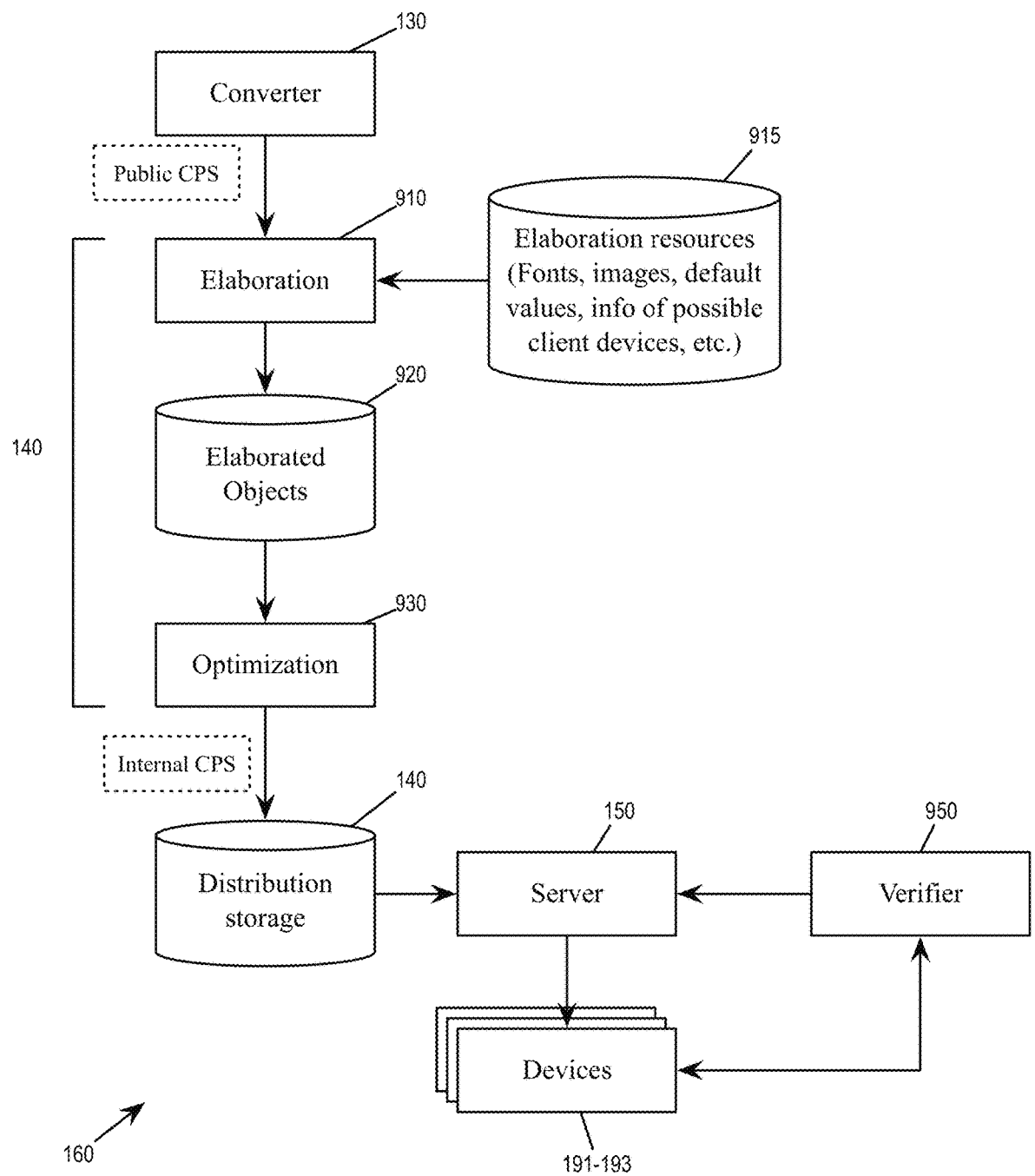
FIG. 9 illustrates the operations that some embodiments perform to convert a public CPS into an internal CPS.

FIG. 9 illustrates the operations that some embodiments perform to convert a public CPS into an internal CPS. The figure illustrates the operational blocks of the distribution sub-system 160 between the creation of the rich CPS by templating and the distribution of the internal CPS to the client devices.

As illustrated, the distribution sub-system 160 includes the converter 130, an elaboration stage 910, an elaborated objects storage 920, an optimization stage 930, the distribution storage 155, and the server 150. The converter 130 is for converting the authored CPS into the rich CPS as described above in Section II.a.

The elaboration stage 910 (part of the elaborator 140) receives public CPS (either a rich CPS from the converter 130 or an authored CPS directly from the publisher 110) and elaborates the objects specified by the public CPS. In some embodiments, each statement in the CPS defining a property or a component (or a property of a component) is regarded as an object by the elaboration stage. In some embodiments, elaborating an object includes filling in default values for properties that are required for presentation but not specified by the public CPS, following references to gather the necessary resources for presentation (fonts, images, media clip, animation image sequences, etc.), and information about different possible types of client devices. The figure conceptually illustrates a storage 915 (elaboration resources) for providing the data needed for the elaboration. The storage 915 can be a storage device in one location, or a collection of storage device distributed across multiple devices in multiple locations that are accessible through a network or Internet (e.g., cloud storage). The elaboration stage 910 also applies at least some of the required processing (image filtering, parental control, etc.) on the gathered resources.

The output of the elaboration stage is stored into an elaborated object storage 920. This storage holds the elaborated version of each object and the resources that are gathered by the elaboration stage. These data in some embodiments can include the default values that are identified, fonts that will be used at client devices, and images resized to different resolutions and sizes based on different client device types, etc.

The optimization stage 930 reads the elaborated objects, optimizes the data structure and writes the optimized result to the distribution storage 155. In some embodiments, the optimizer identifies redundancies and reduces the size of the data structure by e.g., utilizing references, performing compression, etc. In some embodiments, the optimizer restructures the public CPS into structures and syntax that are more readily understood by the client devices. The optimizer then outputs the result as internal CPS to be stored in the distribution storage 155.

The distribution storage 155 stores various internal CPSs for various authored content such as news or magazine articles. When the server receives a request for a particular pace of authored content, it retrieves the corresponding internal CPS from the distribution storage 155 and delivers it to the requesting client device (191-193). In some embodiments, the server 150 would deliver content (internal CPS) only if a verifier 950 in the distribution sub-system 160 has determined that the requesting client device has met the qualifications for the content delivery. In some embodiments, the verifier 950 is an Internet vending mechanism, which verifies whether the authored content is paid for and authenticates whether the proposed receiving client device is indeed the intended recipient of the internal CPS.

Figure 10:
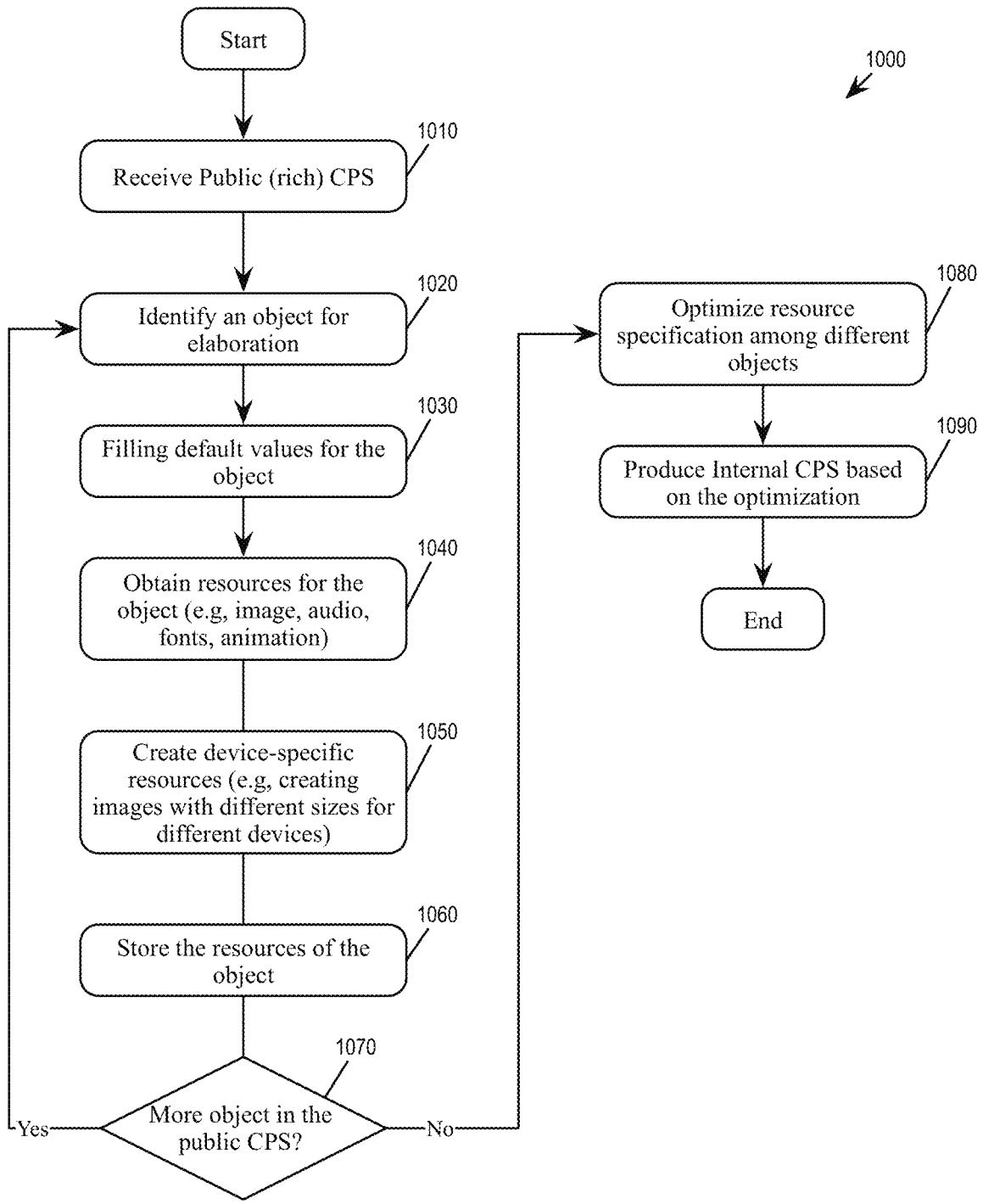
FIG. 10 conceptually illustrates a process for converting a public CPS into an internal CPS.

For some embodiments, FIG. 10 conceptually illustrates a process 1000 for converting a public CPS into an internal CPS. The process is performed by one or more devices participating in the distribution system 160 in some embodiments.

The process starts when it receives (at 1010) a public CPS, which can be a rich CPS from templating or an authored CPS directly from a publisher. The process then identifies (1020) an object in the public CPS for elaboration. Such an object can be a component or a property of the CPS. The process then fills (1030) default values for where such values need to be defined for the identified object in the presentation yet not specified by the public CPS.

Next, the process gathers (at 1040) the resources needed for presenting the identified object, resources such as images, media clips, fonts, etc. The process then creates (1050) device-specific resources for the identified object based on information on the possible types of client devices. In some embodiments, this includes creating multiple versions of an image at different sizes or at different resolutions based on possible display sizes of the client devices. The process then stores (1060) the gathered resources and the created resources of the object into a storage (i.e., the elaboration storage 920).

The process then determines (at 1070) whether there are more objects to be elaborated in the public CPS. If so, the process returns to 1020 to elaborate the next object. Otherwise, the process proceeds to 1080.

At 1080, the process optimizes the elaborated resources stored in the elaboration storage by e.g., identifying redundancies, utilizing references and perform compression. For some embodiments, this operation reduces the size of the resulting internal CPS by eliminating duplicate resources. The process then produces (at 1090) an internal CPS based on the optimized result of the elaboration. In some embodiments, the produced internal CPS is stored in a distribution storage (e.g., 155) for subsequent distribution. The process 1000 then ends.

An internal CPS, once generated, is stored in a distribution storage. A client device running a reader application would make requests for internal CPSs based on the article that it is presenting. Once the request is made for an internal CPS (e.g., of an article), the distribution server (150) delivers the requested internal CPSs to the requesting client device. Upon receiving an internal CPS, the client device performs layout operations to determine the size, shape, and position of the various components.

III. Layout Generation

As mentioned, an internal CPS is an elaborated CPS that is optimized to facilitate delivery to client devices. Each of the client devices is in turn running a reader application for creating a presentation based on the internal CPS, i.e., using the internal CPS as the document definition to the reader application. To keep the size of the internal CPSs small for delivery, some embodiments specify in internal CPSs only information that the client devices cannot decide for themselves, such as the author's intent. To that end, the internal CPS describes components in general terms applicable to all client devices rather than specific terms applicable to only a subset of devices. Consequently, components in an internal CPS of some embodiments specify their layout in coarse terms (e.g., columns instead of display pixels or points), and only in terms of relative position and width but not height. It is up to the client device to determine the actual size, shape, and position of the components in a layout operation based on its own device-specific design rules.

Figure 11:
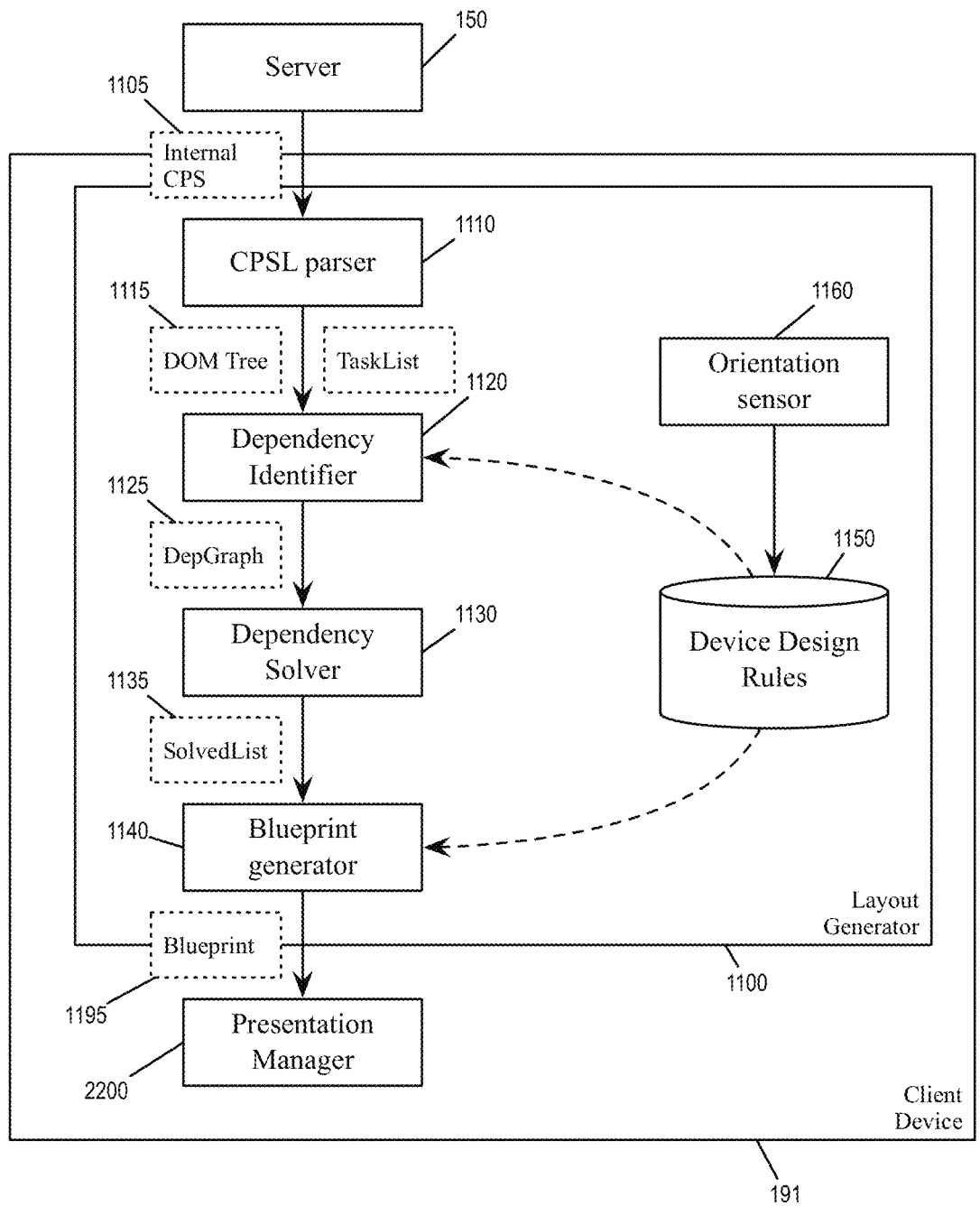
FIG. 11 illustrates the operations performed by a layout generator when laying out a blueprint of the presentation based on a received internal CPS.

In some embodiments, the client device includes a layout generator and a presentation manager. (In some embodiments, the layout generator and the presentation manager are different operations performed by the same reader application running on the client device.) The layout generator determines the shape, size, and position of each component based on information in the internal CPS and finalizes the layout of the component in a blueprint. Each component has a corresponding layout slot in the blueprint that is determined by the layout generator. The presentation manager then renders each component (at the component's layout slot) for presentation according to its finalized layout specified in blueprint. FIG. 11 illustrates the operations performed by a layout generator 1100 when laying out a blueprint of the presentation based on a received internal CPS. The layout generator 1100 is part of the client device 191, which also includes a presentation manager 2200.

The figure illustrates the operational blocks of the layout generator 1100 from the reception of an internal CPS 1105 to the outputting of a blueprint 1195. As illustrated, the layout generator 1100 includes a CPSL parser 1110, a dependency identifier 1120, a dependency solver 1130, and a blueprint generator 1140. The CPSL parser 1110 receives the internal CPS 1105 from the distribution server 150 and the blueprint generator 1140 produces the blueprint 1195 for the presentation manager 2200. In some embodiments, these operational blocks are separate modules of a computing device. In some embodiments, these operational blocks are different operations of a same software program.

The CPSL parser 1100 parses the internal CPS 1105 according to the syntax rules of CPSL and produces an initial DOM (Document Object Model) tree describing the CPS. The DOM tree organizes various objects of the CPS (such as components, layouts, and styles) into interrelated nodes. The dependency identifier 1120 then traverses the DOM tree 1115 to identify the dependencies between the components in the CPS to produce a dependency graph 1125. The dependency solver 1130 then solves the dependency graph 1125 into a solved list 1135 for identifying an order according to which the blueprint generator 1140 should follow when laying out each component (i.e., to determine their finalized/actual shape, size, and position). The blueprint generator 1140 then outputs a blueprint of the CPS that specifies the exact shape, size, and position of each component.

As mentioned, in some embodiments, the layout of the CPS components at a client device is constrained by the design rules of that client device. In some embodiments, the design rule of a client device is specified in accordance with the display dimensions and capabilities of the device. As illustrated, the client device 191 maintains a set of design rules 1150 that are applied during the layout process. Specifically, the design rules 1150 are applied when identifying dependencies of components (at the dependency identifier 1120) and when laying out each component (at the blueprint generator 1140). Some devices have different display dimensions when placed at different orientations (e.g., when being held length-wise horizontally or when being held length-wise vertically). In some embodiments, the device design rules that are being applied is determined by the orientation of the device, for example, based on the output of the client device's orientation sensor 1160.

Figure 12:
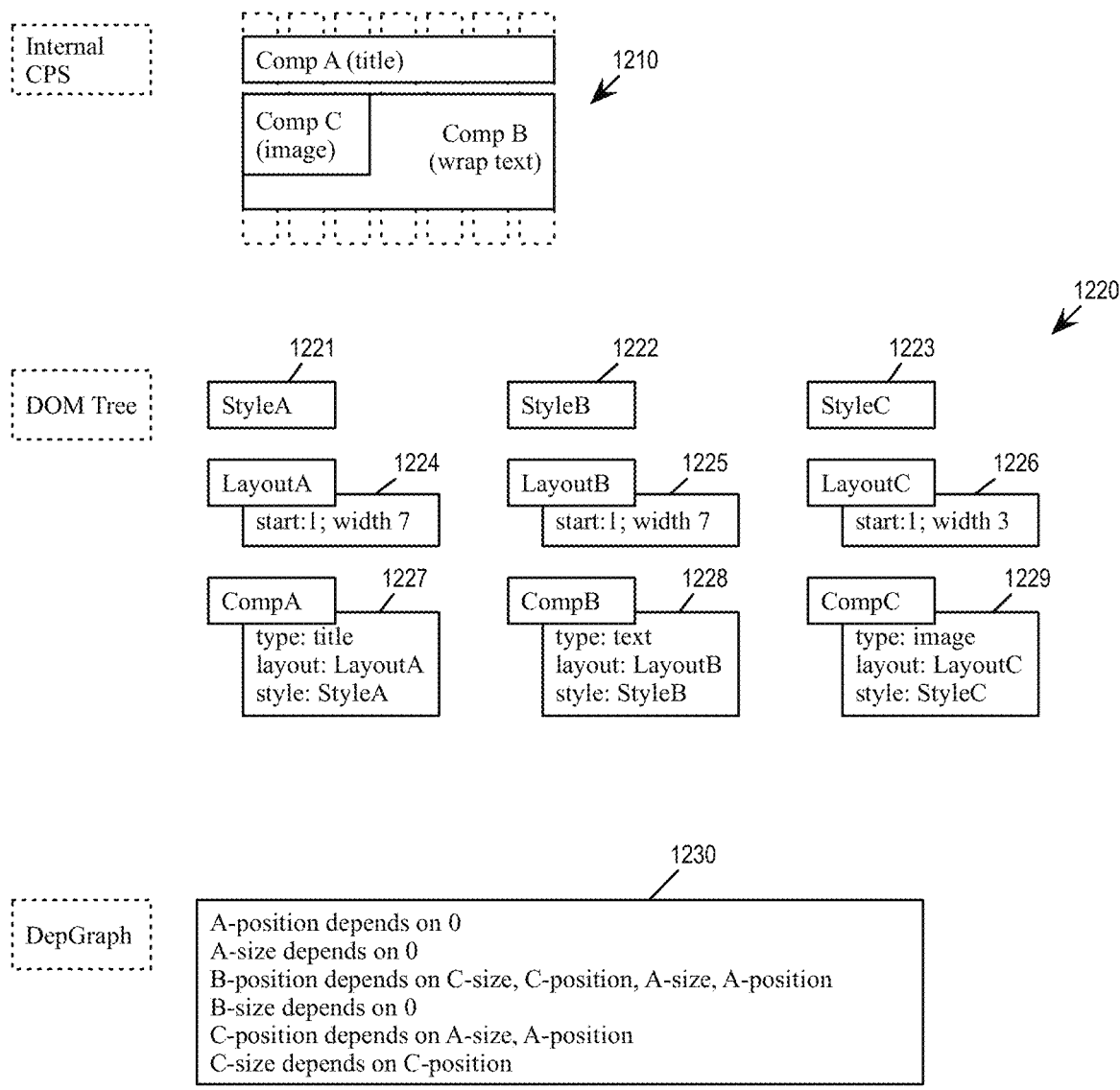
FIG. 12 illustrates an example internal CPS, and its corresponding DOM tree and dependency graph.

FIG. 12 illustrates an example internal CPS 1210, and its corresponding DOM tree 1220 and dependency graph 1230. The internal CPS 1210 specifies three components A, B, and C. The DOM tree 1220 is generated based on the example internal CPS 1210, and the dependency graph 1230 is derived based on the DOM tree 1220.

For each component, the internal CPS 1210 specifies its role, its association, its width, and its horizontal position. The specification of the width and the horizontal position of the component are initial specifications for indicating the publisher/author's intent. In some embodiments, these initial widths and the positions are specified coarsely by referring to columns. The subsequent stages of the layout generation would change the specification of these widths and positions into ones specified by display points or pixels. In some embodiments, those subsequent stages of layout generation can also change the widths and the positions of the components based on the design rules of the device.

In some embodiments, the CPS initially specifies the layout of the presentation in terms of number of columns (or vertical layout sections). For instance, a common design layout uses 7 columns. Each content component or block is assigned to a particular integer number of columns in the layout. For example, an image might span numerous columns (as would its caption text), and body text will often span all of the sections of the layout. In some embodiments, a text block that spans several columns will have each of its lines of text spanning all of the columns (unless the text is flowing around another content component), rather than the text filling up a first column and then continuing at the top of the next column.

In some embodiments, the width of columns is kept nearly constant across different devices, and different devices in different orientations may use different numbers of columns to present the same authored content. For example, a tablet in landscape orientation will have more columns than the same tablet in portrait orientation. A smart phone in either orientation will have fewer columns than a tablet, while a laptop or a desktop monitor will have more columns than a tablet.

As illustrated, component A is specified to occupy the full width of the screen, which is 7 columns. Component B is also specified occupy the full width of the screen, but as wrap around text of Component C. Component C is specified to occupy 3 columns, starting at the first column. None of the component has a specification for height, as those will be determined in later stages of the layout generation process according to ordering established by dependency.

As mentioned, components in an internal CPS specify their roles. In this case, component A is the title of the article, component B is the body text of the article, while component C is an image of the article. In some embodiments, the roles of component will be used to determine the dependencies of the components. For example, being the title of the article, component A will be placed above components B and C. This means that the height of component A will decide the placement of components B and C. The position of components B and C will therefore depend on the position and the size of component A, and the positions of components B and C cannot be determined until the position and the size of component A is determined. Likewise, since component B is text that wraps around the image component C, the position of B cannot be determined until the position and the size of C is determined, i.e., the position of B depends on component C's position and size. The size of component C is dependent on the position of component C, because component C is an image that can be placed either close to the edge of display (constrained to a smaller size) or far from the edge of the display (allowed to be larger). These dependencies are captured by the dependency graph 1230.

In order to facilitate the identification of dependencies, some embodiments process the internal CPS 1210 and generate the DOM tree 1220. The DOM tree decomposes the internal CPS 1210 into objects. As illustrated, the DOM tree 1220 includes objects 1221-1229, where objects 1221-1223 are style specifications, objects 1224-1226 are different sets of initial layout specifications (in terms of columns), and objects 1227-1229 are components of the internal CPS 1210. The objects of the DOM tree refer to each other, specifically, component objects 1227-1229 refers to the layout objects 1224-1226 and the styles objects 1221-1223. By decomposing the internal CPS 1210 into the DOM tree 1220, the dependencies between the sizes and positions of the components can be more readily identified.

In some embodiments, the layout dependencies of components are also determined by their associations, or anchoring. In some embodiments, when a first component is associated with or anchored to a second component, the layout generator would align the first component with the second component. This type of alignment necessarily means that the position of the first component depends on the position of the second component. In some embodiments, a component can be explicitly anchored to another component in the CPS by explicit statements in CPSL (such as by a property definition in a component). In some embodiments, such association or anchoring is inferred from initial position specification provided by the internal CPS.

Figure 13A:
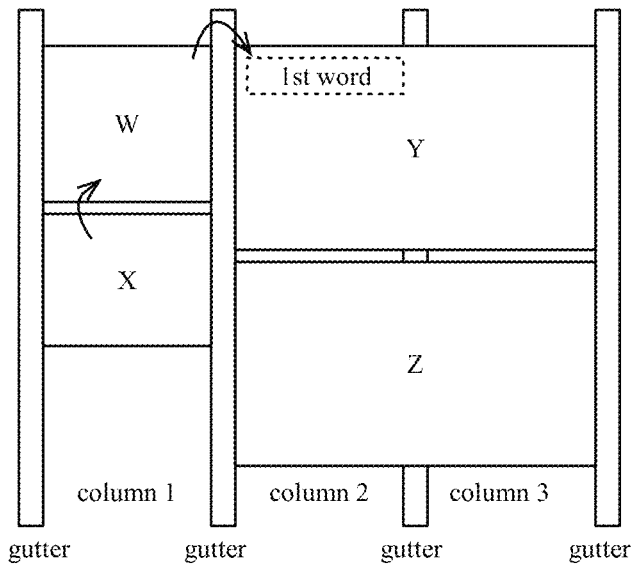
FIG. 13a illustrates an example dependency identification based on associations inferred from initial placements in the internal CPS.

FIG. 13a illustrates an example dependency identification based on associations inferred from initial placements in the internal CPS. An internal CPS provides initial specification position and size for 4 components: W, X, Y, and Z. The component W is placed in column 1 and nearly aligned with component Y in columns 2 and 3. The component X is placed right below component W. The layout generation process therefore associates component W with component Y and associates component X with component Y. This means the position of component X is dependent on the position and size of component W, and the position of component W is dependent on the position of component Y.

Figure 13B:
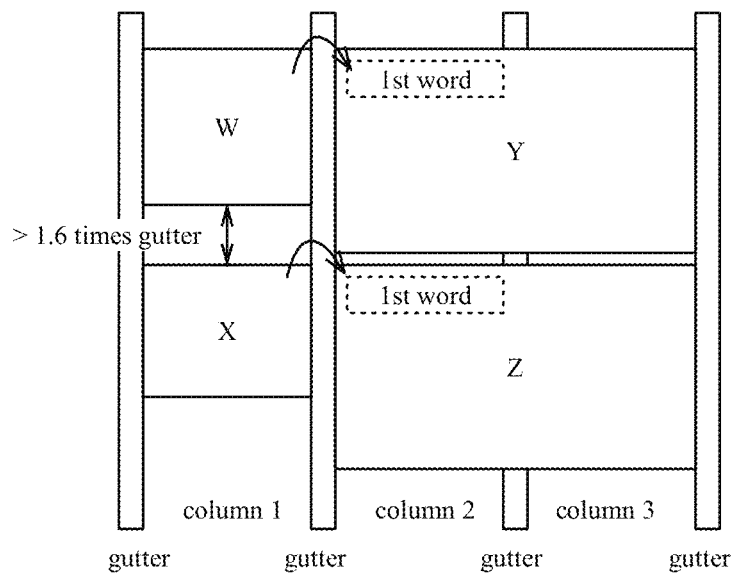
FIG. 13b illustrates another example of dependency identification based on inferred associations.

FIG. 13b illustrates another example of dependency identification based on inferred associations. Like FIG. 13a, an internal CPS provides initial specification for components W, X, Y, and Z, and W is placed nearly in alignment with Y. Component X is placed beneath component W, but at a separation that is greater than a certain threshold. In some embodiments, this threshold is defined in terms of gutter width (1.6 times in this example; in some embodiments, columns are separated by gutters as illustrated.) In this example, since component X is placed too far below component W (separation greater than the threshold), it is no longer associated with component W. It is instead associated with component Z, with which it is nearly aligned. Since component Z is placed beneath component Y, the layout generator would identify the position of X as dependent on position of Z, while the position of Z is dependent on the position and the size of Y.

Figure 14A:
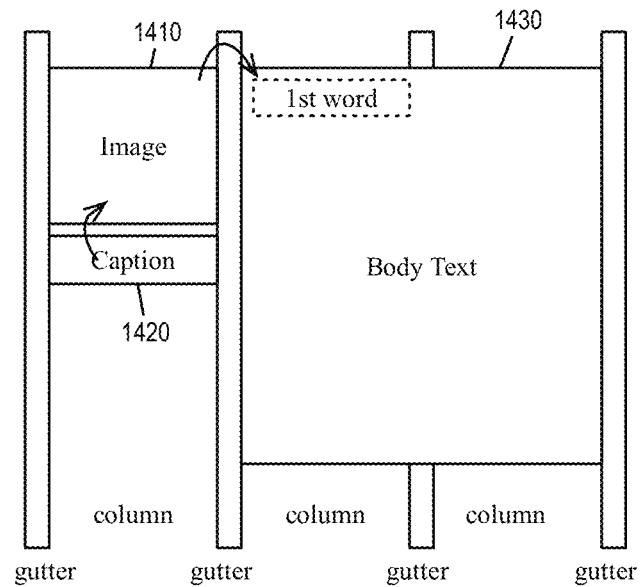
FIG. 14a illustrates an example dependency identification based association inferred from roles.

In addition to inferring association and dependencies based on initial placement, some embodiments infer association based on component's roles. FIG. 14a illustrates an example dependency identification based association inferred from roles. In this example, the internal CPS specifies an image component 1410, a caption component 1420, and a body text component 1430. The internal CPS initially specifies the image 1410 to be aligned with the body text 1430, and the caption is placed beneath the image. The layout generator in some embodiments therefore associates the caption 1420 with the image 1410 and the image 1410 with the start of the body text 1430. In this instance, the caption's association with the image is established by their roles. Consequently, the position of the caption 1420 is dependent upon the position and the size of the image 1410, while the position of the image 1410 is dependent upon the position of the body text 1430.

Figure 14B:
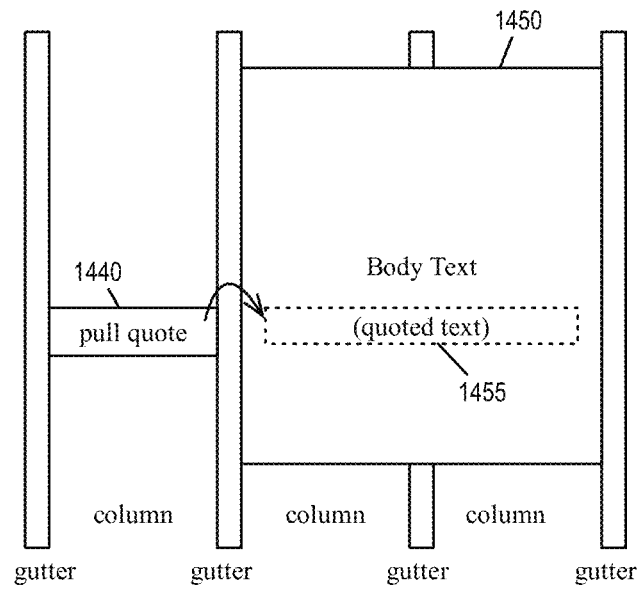
FIG. 14b illustrates another example dependency identification based on association inferred from roles.

FIG. 14b illustrates another example dependency identification based on association inferred from roles. In this example, the internal CPS specifies a pullquote component 1440 and a body text component 1450. As mentioned, a pullquote is a repeat of text in the body text for emphasis. Some embodiments therefore would align the pull-quote 1440 with it source quoted text 1455 within the body 1450. The position of the quoted text within the body 1450 is proportional to the overall size of the body 1450 (which is determined by the font and the length of text in the body), consequently, the position of the pull-quote 1440 is dependent upon the position and size of the body text 1450.

As mentioned, the client device in some embodiments applies device-specific design rules during the layout generation process. These design rules are enforced to ensure that the resulting blueprint would result in a good looking presentation for the specific display dimensions of the client device. For example, design rules for smaller devices would apply its design rules to ensure that the presentation would fit in its smaller display screen while maintain a beautiful professional appearance. These rules are also dependent on the roles of the component. For example, in some embodiments, texts are resized according to different resizing functions based on roles (e.g., header vs. bodytext). Some rules require that components with certain roles must be certain minimum width, while components with a different role may have a different minimum width.

Figure 15:
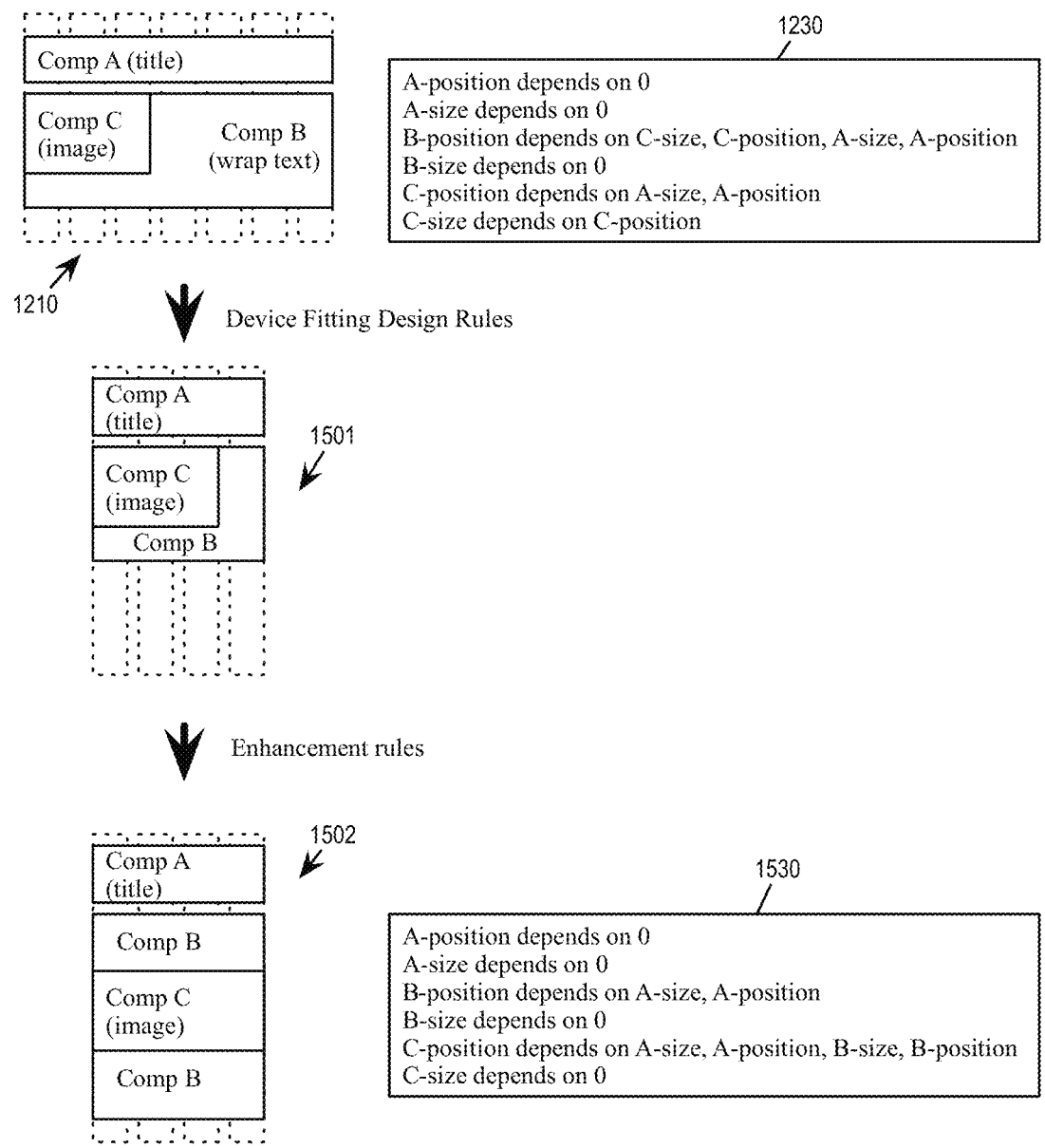
FIG. 15 illustrates how constraints of device design rules affect layout, and hence dependencies of components of an internal CPS.

In some embodiments, the application of such rules changes the positions of some components as well as the alignment between components. In some embodiments, such rules change the dependency between the positions and the sizes of the different components. FIG. 15 illustrates how constraints of device design rules affect layout, and hence dependencies of components of an internal CPS. The example is based on the initial layout specified by the internal CPS 1210 of FIG. 12.

As illustrated, the internal CPS 1210 specifies the initial sizes and positions of components A (title), B (body text), and C (image) based on a 7 column display. However, the internal CPS is received by a smaller client device having only four columns across (e.g., a smart phone in horizontal orientation). The dependencies between the sizes and positions of the components are shown in the dependency graph 1230.

The figure shows two altered layouts 1501 and 1502 due to the application of the design rules. The first altered layout 1501 shows the application of a first set of design rules that constrict the components to a 4-column wide layout of the client device. In this instance, both component A and component B are narrowed to fit the display.

The second altered layout 1502 shows the application of design rules that are specified to ensure that the presentation would look visually pleasing in the 4-column wide display of the client device. The first altered layout 1501, though would fit successfully into the client's 4-column wide display, is not considered professional looking according to a second set of design rules of the client device. Specifically, there is a design rule that require certain minimum font size for (the component with the role) bodytext and forbid the body text of an article to start with just one column in order to avoid rows with only one word. Consequently, the layout generator applies a second set of design rules that lets both component B (bodytext) and component C (image) span across the screen, while placing the component C image in the middle of the component B bodytext. This allows the presentation to use sufficiently large font size for body text while avoiding single word rows.

The application of the design rules as illustrated in FIG. 15 alters the dependency between the positions and sizes of the components as shown in an altered dependency graph 1530. For example, component B's position no longer depend on component C's size and position, but component C's position now depends on component B's size.

Figure 16:
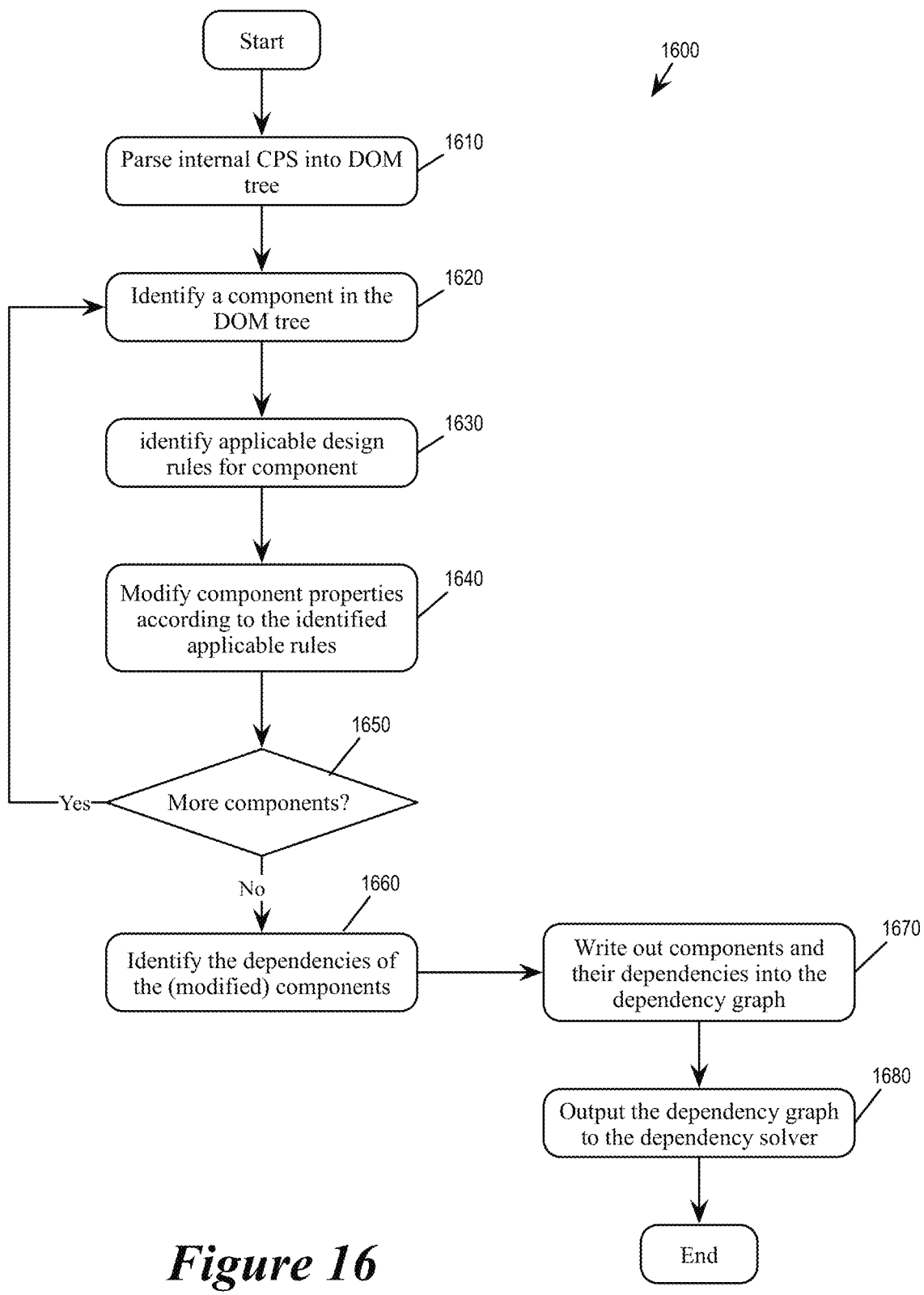
FIG. 16 conceptually illustrates a process for identifying dependencies between the sizes and the positions of the components from an internal CPS.

For some embodiments, FIG. 16 conceptually illustrates a process 1600 for identifying dependencies between the sizes and the positions of the components from an internal CPS. In some embodiments, this process is performed by the layout generator 1100, which is part of the reader application running on the client device.

The process starts when it receives an internal CPS. The process then parses (at 1610) the received internal CPS into a DOM tree by converting objects in the internal CPS into nodes of the DOM tree. In some embodiments, this operation is performed by the CPSL parser operational block 1110 of the layout generator 1100.

The process then identifies (at 1620) a component in the DOM tree and identifies (at 1630) the applicable device-specific design rules for the component. Such identification of rules in some embodiments is based on the role or the type of the component. The process then modifies (at 1640) the component's property based on the identified applicable rule. Such modification can include alterations to font, font size, width, position, color, or other properties/attributes of the component. The process then determines (at 1650) if there are more components in the DOM tree yet to be examined against design rule. If so, the process returns to 1620 to examine another component against the design rules. Otherwise the process proceeds to 1660.

At 1660, the process identifies the dependencies of the components in the DOM tree based on the modifications made due to application of the design rules. The process then writes (1670) out the identified dependencies of the positions and sizes of the components in a dependency graph (such as 1230 and 1530) and outputs (at 1680) the dependency graph for the dependency solver. The process 1600 then ends. In some embodiments, the operations 1620 through 1680 are performed by the dependency identifier 1120 of the layout generator 1100.

As mentioned, the size and the position of components as specified by the internal CPS are only preliminary. It is coarsely specified in terms of columns rather actual display points or pixels, and it does not specify the height of the components. The layout generator therefore has to determine the true position, width/height/shape of the component in terms of display points or pixels. However, since the size and position of a component often depend on the size and/or position of other components, the laying out of a component (i.e., the determination of true position/width/height/shape of the component) cannot take place until the sizes and/or positions of those components that it depend on have been determined. In other words, the layout of components needs to occur in an order that is sorted according to the dependencies between the components. To determine such a sorted order, some embodiments create a dependency graph and use the dependency graph to solve for the order by which the layout of components is to follow.

In some embodiments, the dependency graph is a list of items, where each item corresponds to either to the size of a component or the position of a component. (In other words, each component has two corresponding members in the list: its size and its position). Some embodiments sort the items of the dependency graph into a solved list, which is in an order that when followed, allows that the layout of components to be a linear (i.e., non-iterative) process. Specifically, the determination of the position of a component does not take place until all of its dependencies have been determined, and likewise for the determination of the size of a component.

In some embodiments, the items of the dependency graph are solved by using a stack. The items of the dependency graph are placed in an original, unsorted list. The items in the unsorted list would enter the stack in order. Each item at top of the stack would move on to the sorted/solved list if it has no dependency or if all of its dependencies are already in the sorted/solved list. Conversely, an item having dependencies to items in the unsorted original list would stay in the stack (and have other items pushed on top of it) until all of its dependencies have moved onto the sorted/solved list and is on top of the stack (so can be popped out of the stack).

Figure 17A:
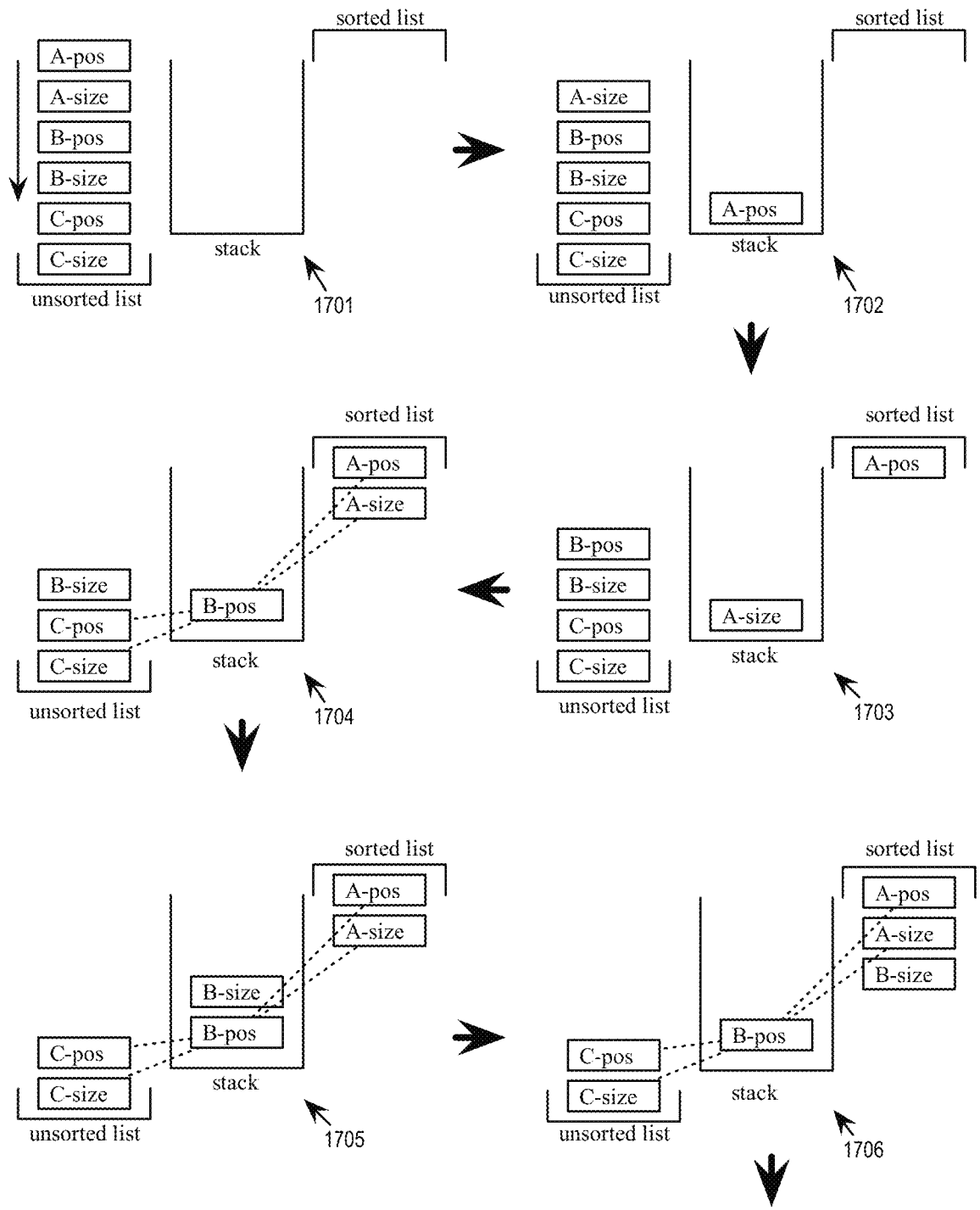
FIGS. 17a-b illustrate using a stack to establish a sorted list according to dependencies between sizes and positions of the components in an internal CPS.
Figure 17B:
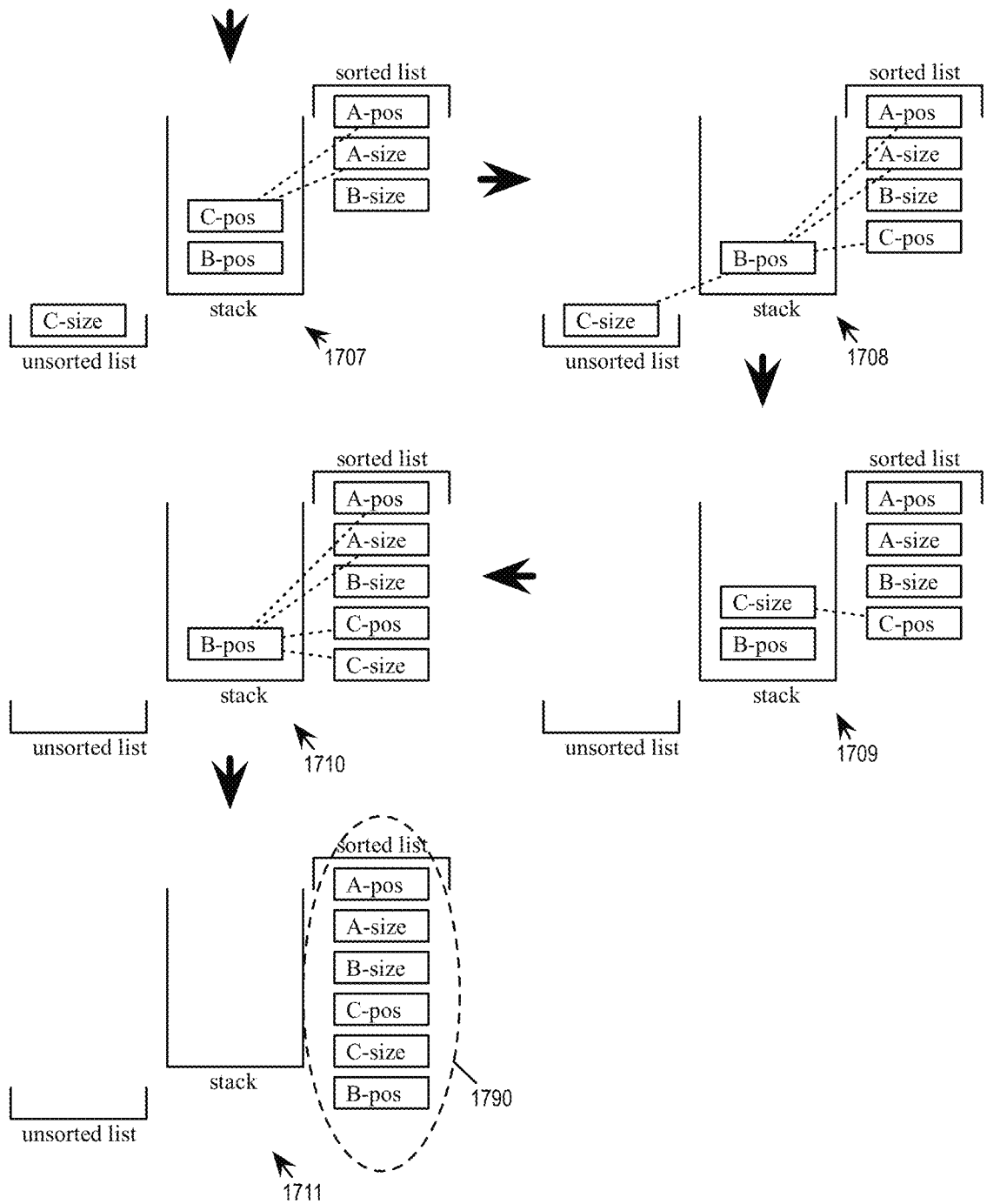

FIGS. 17*a-b* illustrate using a stack to establish a sorted list according to dependencies between sizes and positions of the components in an internal CPS. The Figure illustrates an example based on the dependency graph 1230 of FIG. 12. In other words, this is based on a dependency graph having six items that corresponds to the positions and sizes of components A, B, and C of FIG. 12. The sorting operation is illustrated in eleven stages 1701-1711.

At the first stage 1701, all of the six items (A-position, A-size, B-position, B-size, C-position, C-size) of the dependency graph 1230 are in an unsorted list. In some embodiments, this ordering merely reflect the ordering established by the CPSL parser when generating the DOM tree 1220 and have no particular significance. The stack and the sorted list are both empty.

At the second stage 1702, the A-position item is pushed into the stack. However, since A-position has to dependency, it is popped out and placed into the sorted list immediately. At the third stage 1703, A-position has joined the sorted list while A-size is pushed into the stack. Again, since A-size has no dependency, it is also popped out and placed into the sorted list immediately.

At the fourth stage 1704, A-size has joined the sorted list beneath A-position. B-position has been pushed into the stack. B-position has dependencies to A-position, A-size, C-position and C-size. Since C-position and C-size are still in the unsorted list, B-position must remain in the stack until C-position and C-size have moved onto the solved list.

At the fifth stage 1705, B-size has been pushed into the stack, since B-size has no dependency, it is popped out immediately. At the sixth stage 1706, B-size has joined the sorted list following A-size. B-position is once again at top of stack following the pop of B-size. However, since B-position still has dependencies in the unsorted list (i.e., C-position and C-size), it must remain in the stack.

At the seventh stage 1707, C-position has been pushed into the stack. C-position depends on A-position and A-size. Since A-position and A-size are already in the sorted list, C-position is free to be popped out of stack. At the eighth stage 1708, C-position has joined the sorted list below B-size, and B-position is once again at top of stack following the pop of C-position. However, since B-position still has dependencies in the unsorted list (i.e., C-size), it must remain in the stack.

At the ninth stage 1709, C-size has been pushed into the stack. C-size depends only on C-position, and C-position is already in the sorted list. Consequently, C-size is immediately popped off the stack. At the tenth stage 1710, C-size has joined the sorted list under C-position. B-position is once again at the top of the stack. At this stage, all of B-position's dependencies have joined the sorted list (i.e., A-position, A-size, C-position, and C-size). It is therefore finally free to join the sorted list.

At the eleventh and final stage 1711, all of the items in the original unsorted list have joined the sorted/solved list in an order that is established according to the identified dependencies. The sorted list is then outputted as an ordered list 1790 for the layout generator. The layout generator in turn uses the ordering to determine the actual position, size, and shape of each component.

Figures 18, 19:
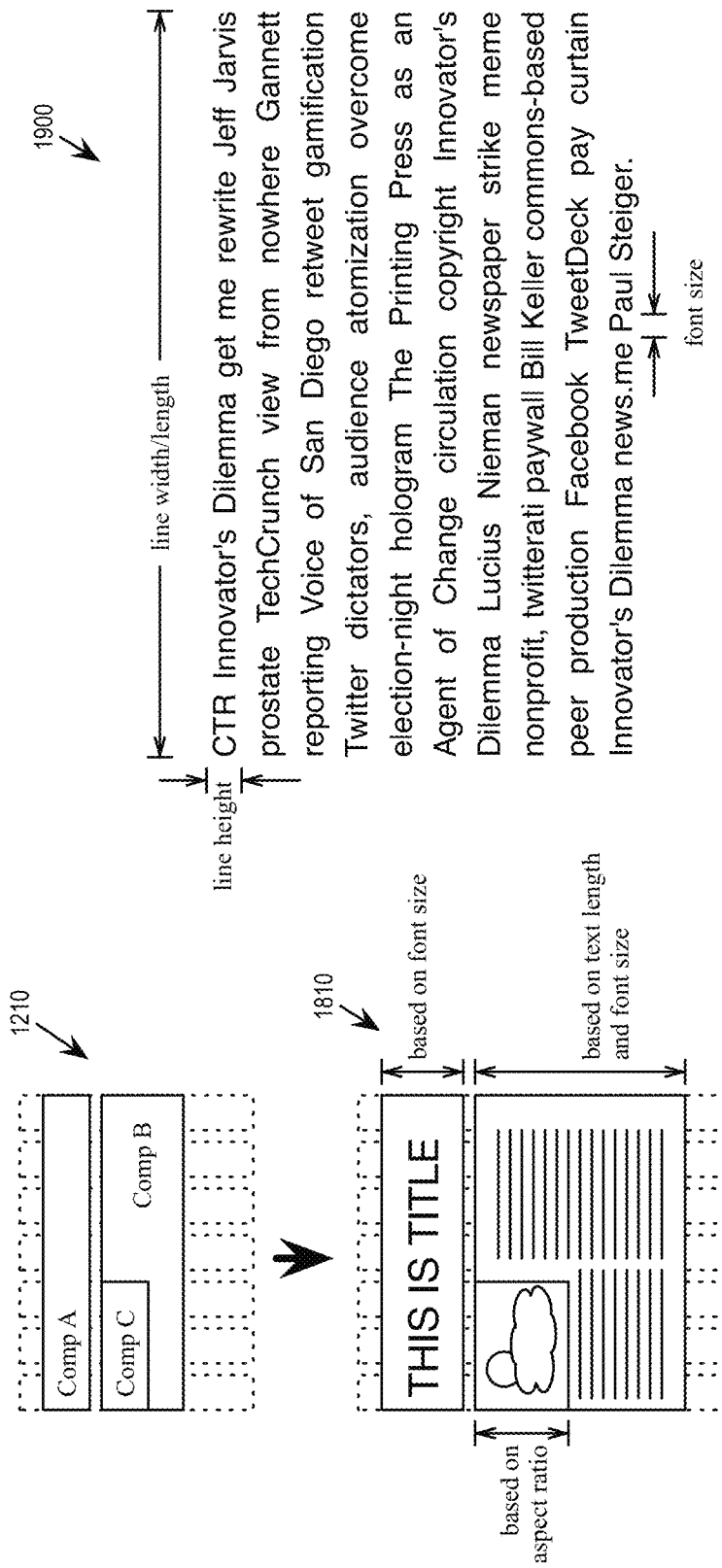
FIG. 18 illustrates the generation of blueprint by finalizing the lay out of the components of the CPS.
FIG. 19 illustrates the determination of the size of an example component.

FIG. 18 illustrates the generation of blueprint by finalizing the lay out of the components of the CPS. The figure illustrates the layout of the components of the internal CPS 1210 (title components A, image component B, and bodytext component C) into a blueprint 1810. In some embodiments, finalizing the layout of a component determines its actual position, shape, and size in terms of display points or pixels.

Determining the finalized layout of the components follows an order established by the order list 1290, which is sorted from the dependency graph 1230. According to this ordering, the layout generator determines the finalized position and size of each component. In other words, the determination of layout will be done in the order of: (from first to last) component A's position, component A's size, component B's size, component C's position, component C's size, and component B's position.

Component A's position is determined based on the specification of the internal CPS (or the DOM tree).

Component A's size is determined based on the font size and its text length (longer text length and larger font size would result in larger size for component A).

Component B's size is determined based on its font size and text length.

Component C's position is determined based on A's position and A's size, as component C is an image that is below the title component A. Since A's position and A's sizes are now known, C's position can also be determined.

Component C's size is determined based on its own width and aspect ratio. The size is also limited by the component's position.

Component B's position is determined based on the image component C's position and size, as the component B is bodytext that wraps around the image. Component B's position is also dependent on A's position and size, as B is bodytext that is placed beneath the title component A. Once the position and the size (and shape) of each component has been determined, the layout generator produces a blueprint that describes the finalized position and the dimensions of each component in terms of display pixels or points.

FIG. 19 illustrates the determination of the size of an example component 1900. The component 1900 is a text component (e.g., bodytext). The size of the component is based on its line width, its line height, and its font size. As mentioned, the internal CPS only provides an initial specification of the width in terms of columns. Its ultimate height and shape is determined when other parameters such as line height and font size become known, as larger font size and taller line height would result in larger component size as text wraps.

In some embodiments, the layout of components (i.e., the generation of blueprint) is also constrained by the design rules of the device. For a text component, enforcement of a design rule may affect the component's size and position based on the placement of the text and/or the other components (e.g., image) that the text wraps around.

Figure 20:
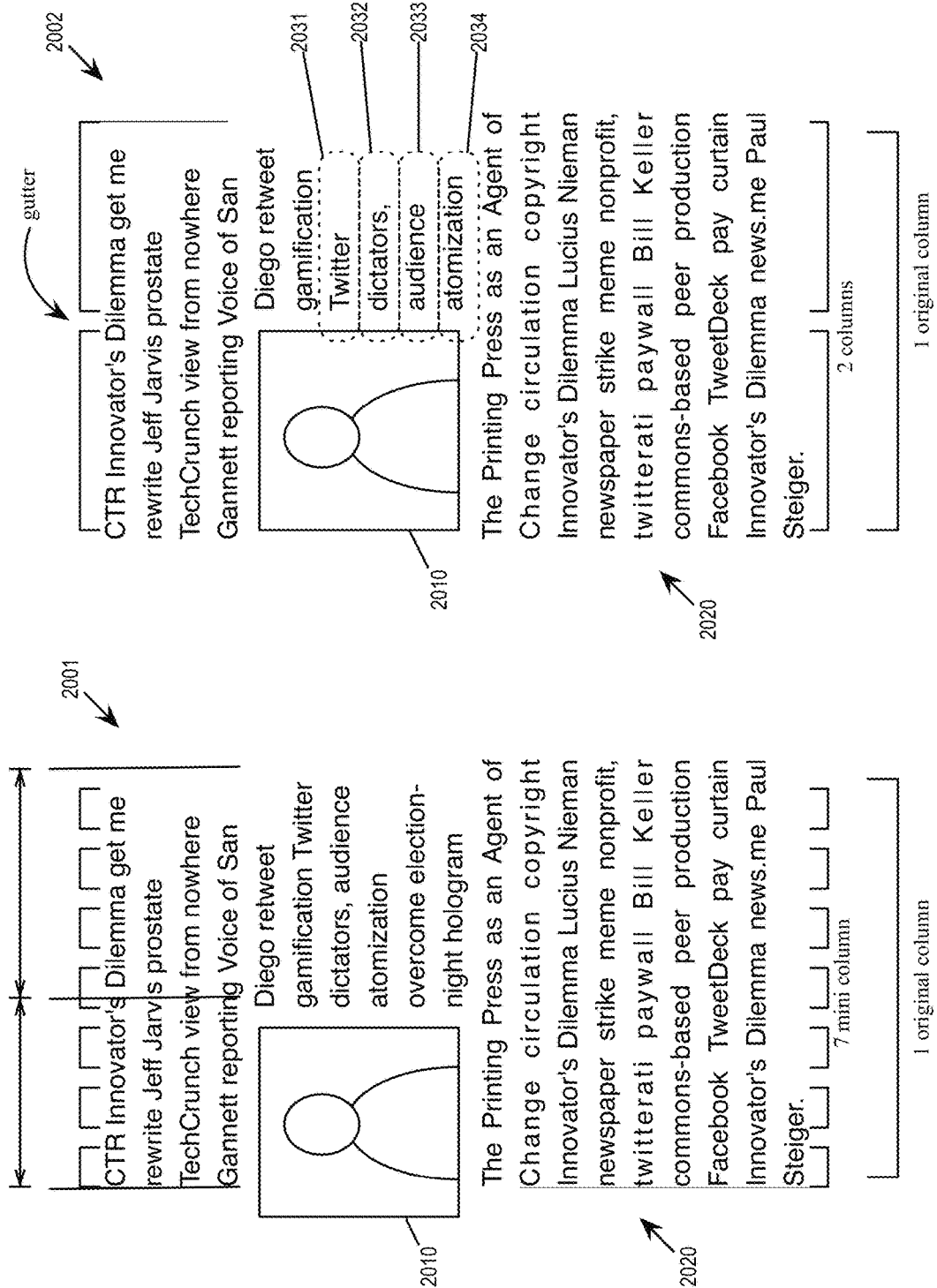
FIG. 20 illustrates some example design rules that affect the layout of text components.

FIG. 20 illustrates some example design rules that affect the layout of text components. Specifically, the figure illustrates some design rules regarding the placement of small images surrounded by bodytext. These images are narrower than one column. For client devices having smaller displays that are only one or two columns wide, the layout generator in some embodiments would stretch the image to span the width of the display rather than having the narrow display be divided between text and the small image. However, some embodiments would let the small image maintain its small size so to split the column between the small image and the wrap text. However, the layout generator of the device would enforce design rules to ensure that the wrap text remain professional looking FIG. 20 illustrates two layouts or (blueprints) 2001 and 2002 for a small image 2010 and a wrap text 2020. The layout 2001 divides the original column of the device into 7 mini-columns. The layout generator then places the components according to their original CPS specification (i.e., as if the small display device has 7 columns). In this instance, the small image 2010 spans three mini-columns, while the wrap text occupy four mini columns, letting a mini gutter separating the text 2020 and the image 2010. The layout 2002 divides the original column into two half-columns. The small image 2010 spans one half-column while the wrap text 2020 occupies the other half-column.

Some embodiments provide design rules for ensuring that the display of a small image would not cause the wrap text to look ugly. For example, design rules in some embodiments require that number of words per line be always be more than a certain number, as having too many lines with a single word would make the text look sparse and uneven (such as lines 2031-2034). Design rules in some embodiments therefore forbid single word lines or allow only a limited number of single word lines. To enforce these design rules, some embodiments choose a layout (e.g., 7 mini-columns vs. 2 half-columns) that would result in fewer one-word lines. Some embodiments would make the gutter smaller, or use a smaller font size, or use a smaller margin in order to fit more words per line and to reduce the number of one-word lines.

Figure 21:
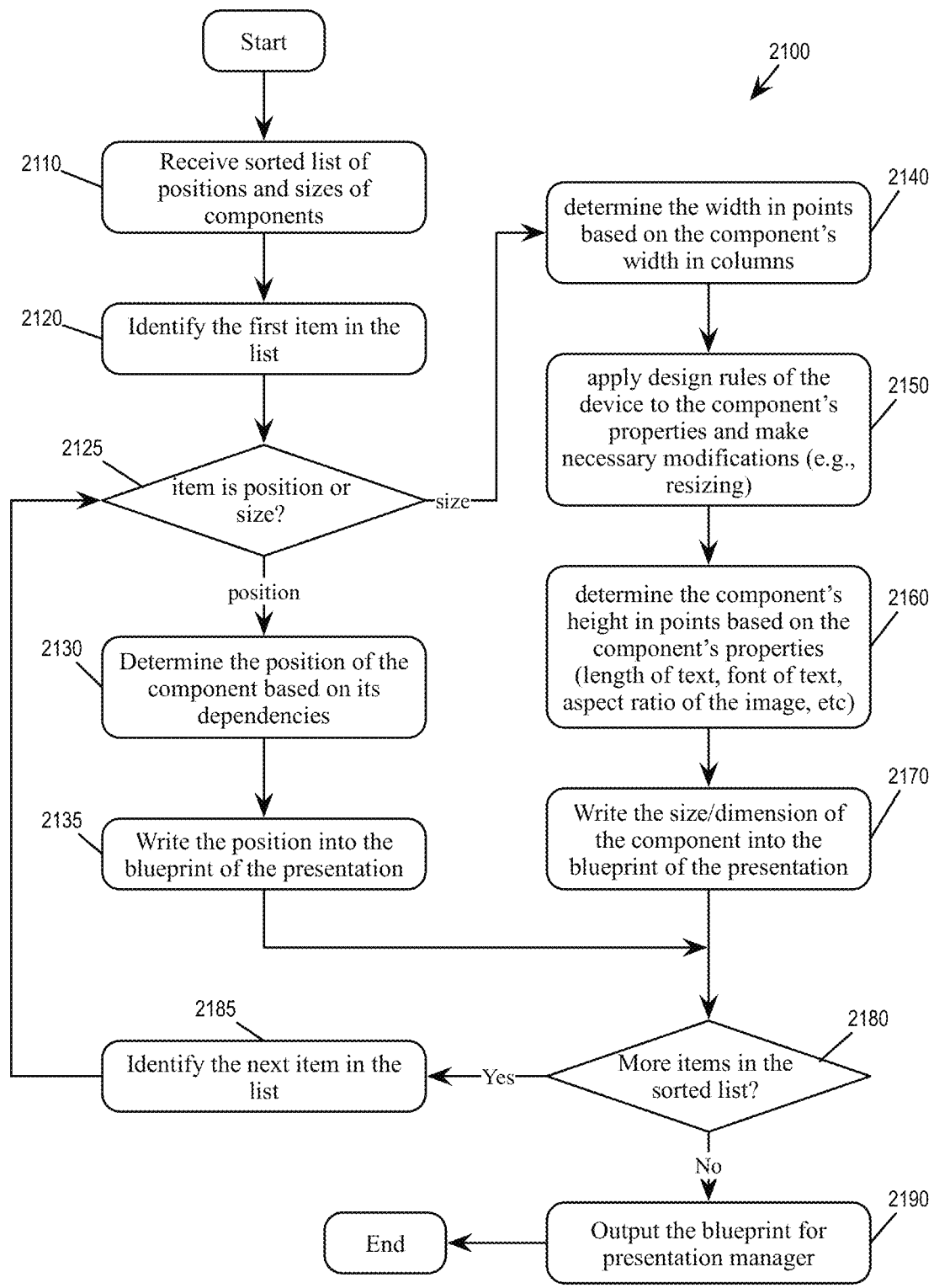
FIG. 21 conceptually illustrates a process for laying out components of a CPS.

For some embodiments, FIG. 21 conceptually illustrates a process 2100 for laying out components of a CPS (i.e., to finalize the shape/size and the position of each component). In some embodiments, the process is performed by the layout generator 1100 (of the reader application running on the client device) when it is producing a blueprint (at its blueprint generator 1140). The process starts when it receives (at 2110) a sorted list of positions and sizes of the components. Each item in the list is either a position of a component or a size of a component. The list provides an ordering that is based on dependencies between the positions and the sizes of the components in the CPS. By following the list, the process is guaranteed that when it is the time to determine the position (or size) of a component, everything that the position (or size) of the component depends on would have already been determined. The creation of such a list is described by reference to FIGS. 17a-b above. The process then identifies (2120) the first item in the list, which can correspond to the position of a component or the size of a component.

The process determines (2125) whether the identified item in the list is the position of a component or the size of a component. If the item is the position of a component, the process proceeds to 2130. If the item is the size of a component, the process proceeds to 2140.

At 2130, the process determines (computes) the position of the component based on its dependencies. For example, if the component is beneath a previously placed component, then the position of this component is computed by offsetting from the position and the size of that previously placed component. The process then writes (at 2135) the determined position into the blueprint of the presentation. The process then proceeds to 2180.

At 2140, the process determines (computes) the width of the component in display points or pixels based on the component's width in columns. As mentioned, each column spans a number of display points, and columns are separated by gutters, each of which also spans a number of display points. The true width of a component is thus the number of pixels or points that are spanned by the specified number of columns and gutters.

The process then applies (at 2150) design rules of the device to the component's properties and makes necessary modifications. In some embodiments, this involves changing the fonts of the component or the line height of the component. Examples of such modifications are described by reference to FIG. 20 above.

The process then determines (at 2160) (computes) the component's height/shape in display points or pixels based on the components properties, such as the length of its text, its font, its aspect ratio (if an image), or the geometries of other components that it has to wrap around, etc. Examples are described by reference to FIGS. 18 and 19 above. The process then writes (at 2170) the determined height/shape of the component into the blueprint of the presentation. The process then proceeds to 2180.

At 2180, the process determines whether there are more items in the sorted list that have not been used to determine the layout of the presentation. If there are more items in the sorted list, the process proceeds to 2185 to identify the next item in the sorted list and returns to 2125. If there are no more items in the sorted list, the process proceeds to 2190.

At 2190, the process output the blueprint of the presentation to the presentation manager (2200). The blueprint specifies the finalized positions and the geometries (size/shape) of each of the components. In some embodiments, the blueprint also carries other properties of each of the components that the presentation manager use for rendering and enact other behaviors when presenting the authored content. The process 2100 then ends.

IV. Presentation

As mentioned, the authored content delivery system delivers an internal CPS of an authored content to the client device to be presented by its reader application. An internal CPS contains the authored content in presentation structures that are enriched with styling/formatting/layout information and elaborated with necessary presentation resources. The client device in turn performs layout operations in order to determine the actual position and size/shape of each component in the presentation of the authored document according to the received internal CPS and the client device's own design rules.

In some embodiments, these actual positions and sizes/shapes of the components are recorded in a blueprint. The layout generator of the client device forwards the blueprint to a presentation manager, which in turn puts together the presentation by rendering the components and enabling other features such as snaplines and animation. (In some embodiments, the layout generator and the presentation manager are different operations performed by the same reader application running on the client device.)

Figure 22:
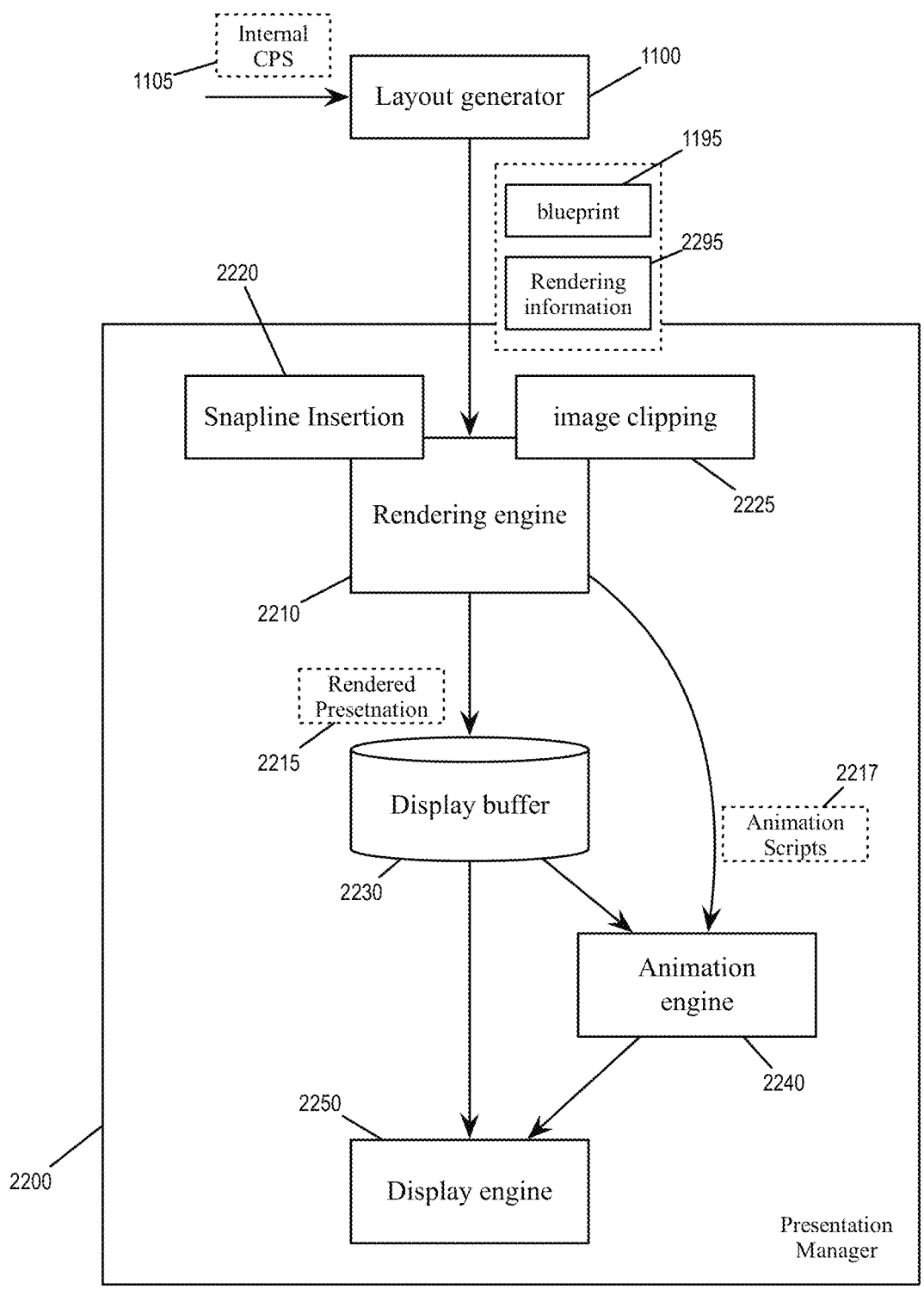
FIG. 22 illustrates a diagram of a presentation manager for putting together the presentation of the authored content for display at the client device.

FIG. 22 illustrates a diagram of a presentation manager 2200 for putting together the presentation of the authored content for display at the client device. The presentation is based on the blueprint 1195 and generated by the layout generator 1100. The presentation is also based on rendering information 2295.

The rendering information 2295 in some embodiments includes information from the internal CPS 1105 that are not carried by the blueprint 1195, such as the actual image data for rendering, font information, roles of components, as well as other properties of the presentation specified by the internal CPS that are beyond the sizes and positions of the components. In some embodiments, the rendering information is embedded in the blueprint. In some embodiments, the rendering information 2295 is provided separately to the presentation manager 2200 by the layout generator 1100.

As illustrated, the presentation manager 2200 includes a rendering engine 2210, a display buffer 2230, an animation engine 2240, and a display engine 2250. The rendering block 2200 also includes a snapline insertion block 2220 and an image clipping block 2225. The blueprint 1195 and the rendering information 2295 are received by the rendering engine 2210, which produces a rendered presentation 2215 to be stored in the display buffer 2230. The rendering engine 2210 also creates animation scripts 2217 for driving the animation engine 2240. The display engine 2250 then displays the presentation based on information stored in the display buffer 2230 as well as animation provided by the animation engine 2240.

The snapline insertion block 2220 is an operational block of the rendering engine. In some embodiments, the snapline insertion block analyzes the blueprint 1195 and the rendering information 2295 to establish snaplines as positions in the presentation that the scrolling by user is more likely to stop at. In some embodiments, snapline insertion is based on the position and sizes of the components as well as the roles of the components. These are information provided by internal CPL 1105 through the blueprint 1195 and the rendering information 2295 in some embodiments. Snapline insertion is further described in concurrently filed U.S. patent application entitled "Intelligent Scrolling of Electronic Document".

The image clipping block 2225 will be described below.

a. Image Clipping

In some embodiments, the images originally provided by a public CPS (either the authored CPS or the template CPS) for image components are not necessarily of the right aspect ratio, or may include scenery or objects irrelevant to the subject matter of the authored document or to the role of the image component. Some embodiments therefore perform clipping to remove parts of the image so the remainder will fit the layout of the component while showing what is relevant to the subject matter as intended by the author. Some embodiments perform image clipping so the resulting image will comply with the image component's size and shape as specified in the blueprint (i.e., as determined by the layout generator based on the device-specific design rules). Furthermore, some embodiments determine the region of the image to crop by identifying a region of interest in the image data based on the role of the component as specified by the CPS.

In some embodiments, the image clipping is performed by the client device, specifically at its presentation manager (2200) after the layout generator (1100) has determined the size/shape and position of all the components in the presentation of the authored document. The presentation manager 2200 performs the image cropping based on the layout information of the component as specified by the blueprint 1195. In some embodiments, the image cropping is further based on the role of the component and the image data itself, which is provided by the rendering information 2295 in some embodiments. In some embodiments, the presentation manager 2200 performs the image clipping at its rendering engine (2210), which includes an image clipping operational block 2225 in some embodiments.

Figure 23:
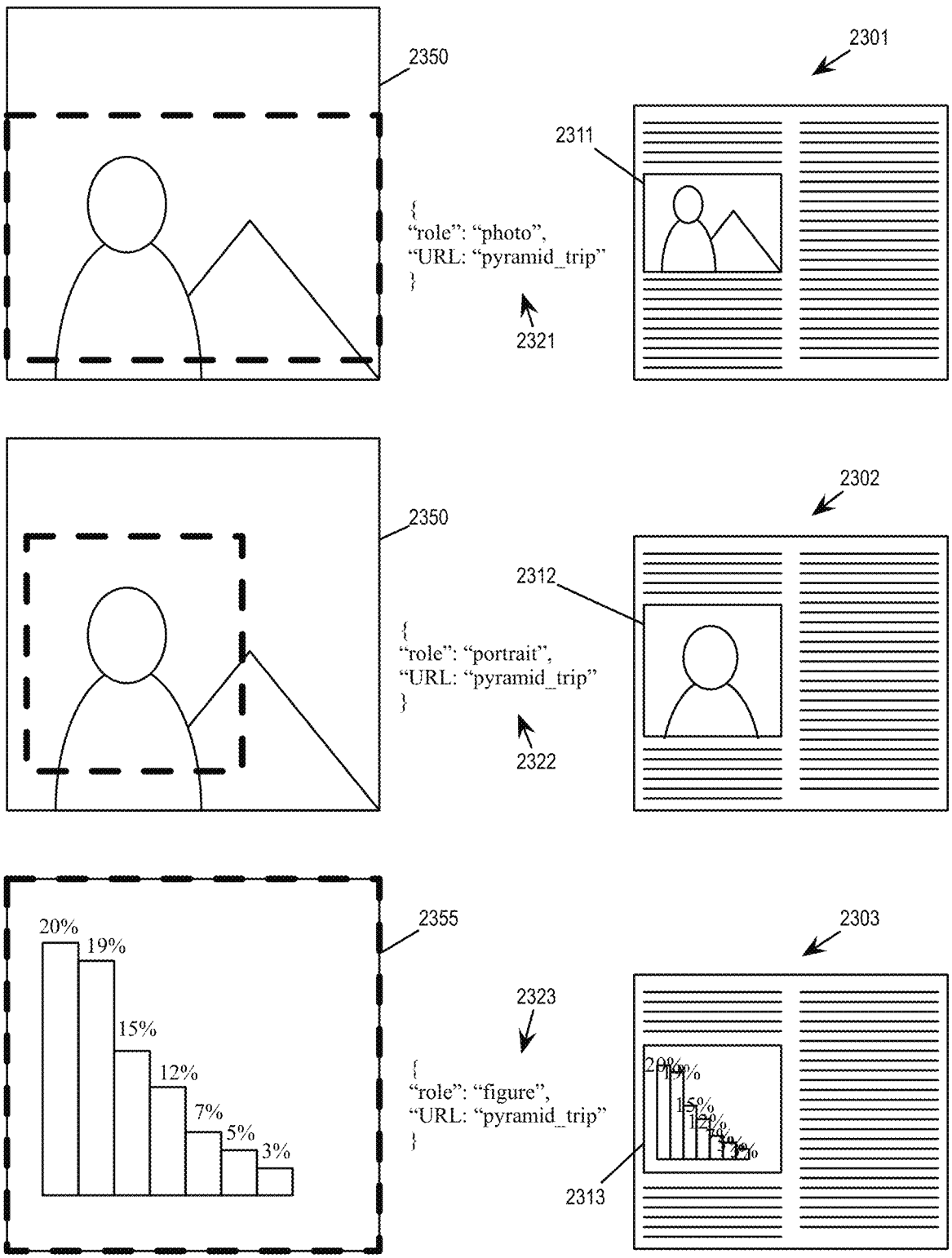
FIG. 23 illustrates several examples of image clipping based on the role and the layout of the image component.

FIG. 23 illustrates several examples of image clipping based on the role and the layout of the image component. The figure illustrates three examples 2301-2303 of image clipping, each has a different role as specified by the CPS, and the image clipping is performed based on the semantic value of the role.

The first example 2301 is an image component 2311 having the role of "photo" that is specified by the CPS 2321. The image data is that of image 2350, which is a square image (aspect ratio 1:1). On the other hand, the image component 2310 according to the layout has aspect ratio of 4:3. Image clipping is thus required in order to fit the image 2350 into the layout of the image component.

In some embodiments, an image with a role of "photo" will be cropped to include as much as the original image into the image component as possible by matching either the height or width of the image to the width/height of the component. In some embodiments, the cropping is accomplished without analyzing the image to identify a region of interest. Some methods of such cropping will be described by reference to FIG. 24 below. In some embodiments, the cropping of photo does include an analysis of the image data for identifying a region of interest, for example, to identify part of image having more information. In this example, the lower portion of the image 2350 has more information (a man and a pyramid) than the higher portion, so the clipping keeps the lower portion for the image component 2310.

The second example is an image component 2312 having the role of "portrait" that is specified by the CPS 2322. The image data is also that of image 2350, which includes more than just the portrait of a person, i.e., the pyramid. In some embodiments, a component having the role of "portrait" would cause the presentation manager to analyze the image to look for a human face and to identify a region of interest around the human face. In this case, the presentation manager identifies a region around the man in the image 2350 for cropping so the remaining image would look like a portrait of a person. The aspect ratio or the shape of the cropped region is determined by the layout of the image component (which is subject to the design rules of the client device), which is in turn based on the role of the component as specified in the CPL.

The third example 2303 is an image component 2313 having the role of "figure" that is specified by the CPS 2323. The image data is that of a bar graph 2355. In some embodiments, the image clipping operation of the presentation manager would not clip an image that has a role of "figure", because it is assumed all information in a figure (such as a generated chart or graph) are intended by the authored to be important and cannot be cropped off. In some embodiments, the layout generator would not alter the aspect ratio of a figure, (i.e., the design rule of the client device would allow a component having the role of "figure" to keep its original aspect ratio). In some embodiments, the aspect ratio as specified by the layout may be different than the figure image (e.g., due to device-specific design rules) so that the image clipping mechanism would alter the aspect ratio/shape of the figure to fit that of the layout.

Figure 24:
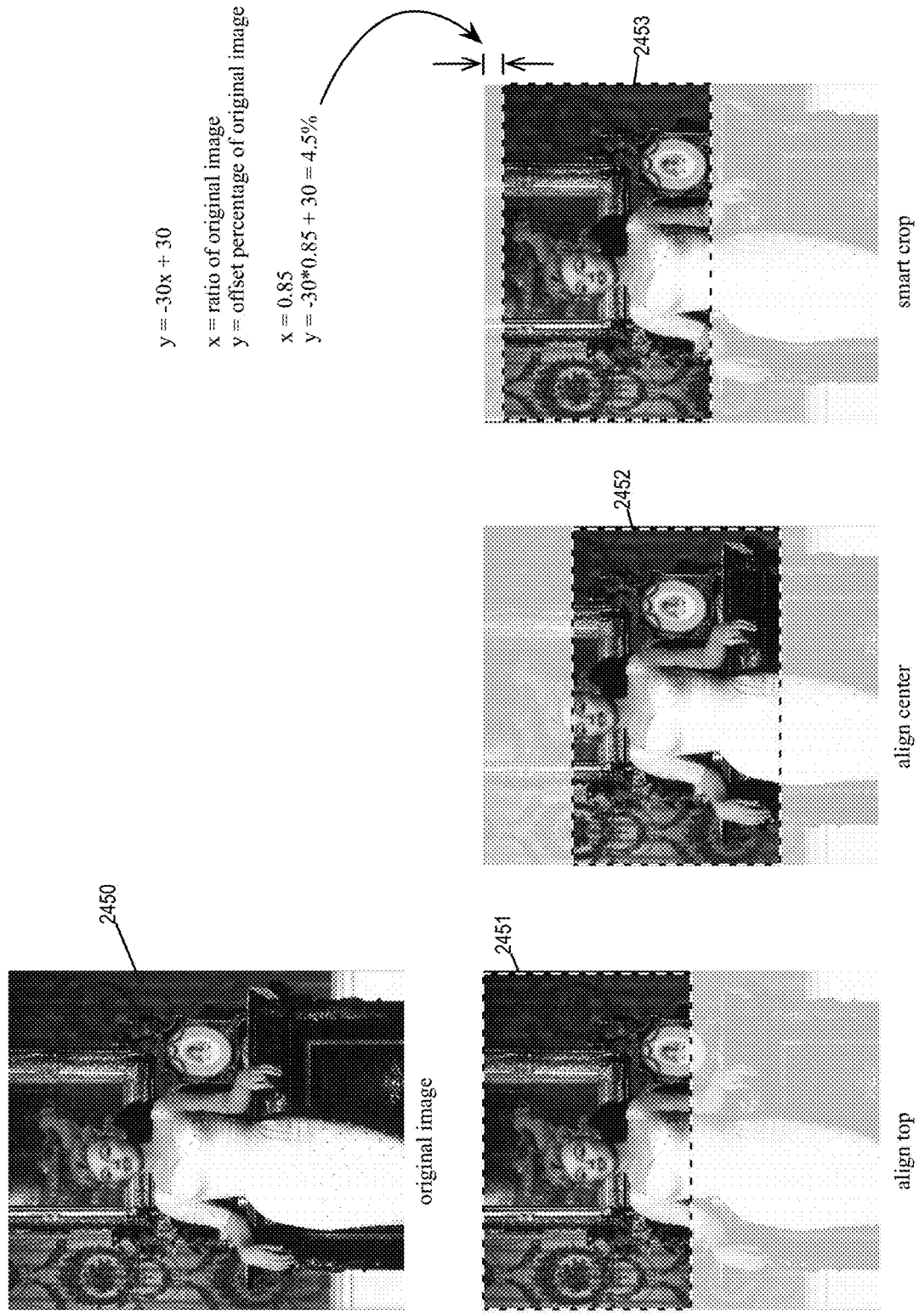
FIG. 24 illustrates image clipping operations performed by some embodiments that are based on the dimensions of the image rather than the content of the image.

FIG. 24 illustrates image clipping operations performed by some embodiments that are based on the dimensions of the image rather than the content of the image. These methods do not involve analyzing the image data to identify a region of interest. Such methods have the advantage of being less computationally intensive thus requiring less delay when presenting the authored content. The figure shows three cropped images 2451-2453 that correspond to three different types of dimension-based image clipping: align-top, align-center, and smart-crop. In some embodiments, the CPS includes further information that specify which cropping method should be used. The examples are based on an image 2450 with a role of "photo". The aspect ratio of the image is 0.85:1. It is to be cropped into a 4:3 image component layout.

The cropped image 2451 is created by align-top, i.e., the cropping starts at the very top of the image so the very top portion of the image is included in the cropped image. The cropped image 2452 is created by align-center, i.e., the cropping is aligned to the center of the image so the middle portion of the image is included in the cropped image.

The cropped image 2453 is created by smart-crop. This method recognizes that for most images, the most relevant part of the image is not necessarily the very top or the very center, but rather at an offset from the top based on the aspect ratio of the original image. In some embodiments, this specific offset is calculated according to the following:

$y=-30*x+30$, where x is the aspect ratio of the original image, and y is the offset percentage of the original image. For the example image 2450, the aspect ratio x is 0.85, its offset percentage y is 4.5%. In other words, if the height of the image is 10,000 pixels, then the smart-cropping of the image starts at the 450th pixel from the top.

Figure 25:
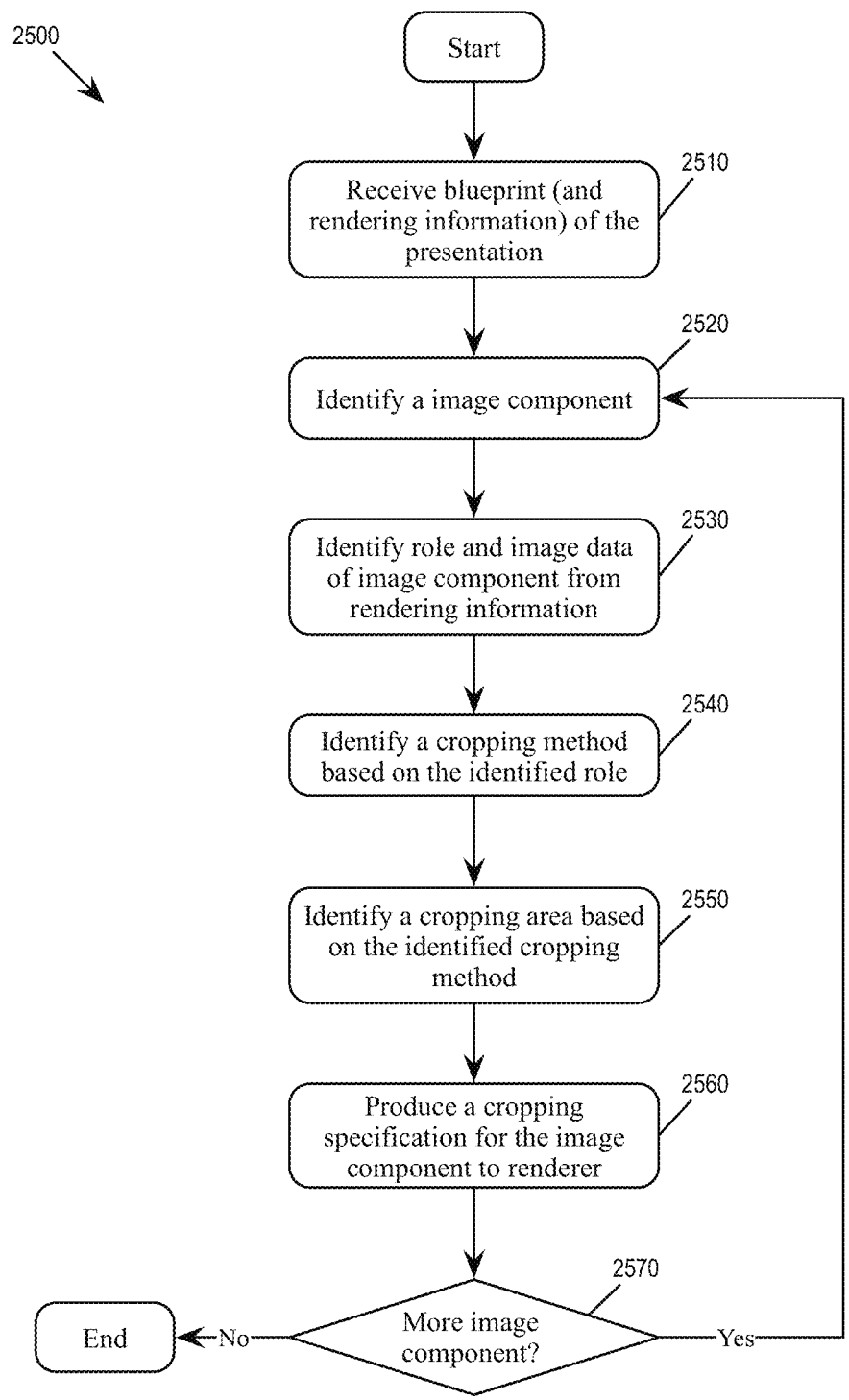
FIG. 25 conceptually illustrates a process for performing clipping/cropping for image components of a CPS-based presentation of authored content.

For some embodiments, FIG. 25 conceptually illustrates a process 2500 for performing clipping/cropping for image components of a CPS-based presentation of authored content. In some embodiments, the process 2500 is performed by the presentation manager of a client device. In some embodiments, the process is performed by the rendering engine 2210 when it is rendering the components of an article. The process receives (at 2510) a blueprint of the presentation of the authored content. The blueprint includes the layout information (position and size/shape of the components) generated by the layout generator. In some embodiments, the blueprint also includes rendering information that provides other information such as image data, component properties, and component roles. In some embodiments, the rendering information is received separately from the blueprint.

The process then identifies (2520) an image component from the blueprint. The process also identifies (2530) the corresponding role and the image data from the rendering information, which is derived from CPS.

The process then identifies (2540) a cropping method based on the identified role. Some of these role-based methods are described by reference to FIGS. 23-24 above. The method then identifies (at 2550) a cropping area based on the identified cropping method. In some embodiments, some methods require an analysis of the image data in order to identify the cropping area (e.g., facial recognition for portraits), while others do not (e.g., smart-crop). Based on the identified cropping area of the image, the process then produces (at 2560) an image-clipping specification for the image component to the renderer.

The process then determines whether there are more image components in the blueprint that have yet to go through image clipping. If so, the process returns to 2520. Otherwise, the process 2500 ends.

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 26:
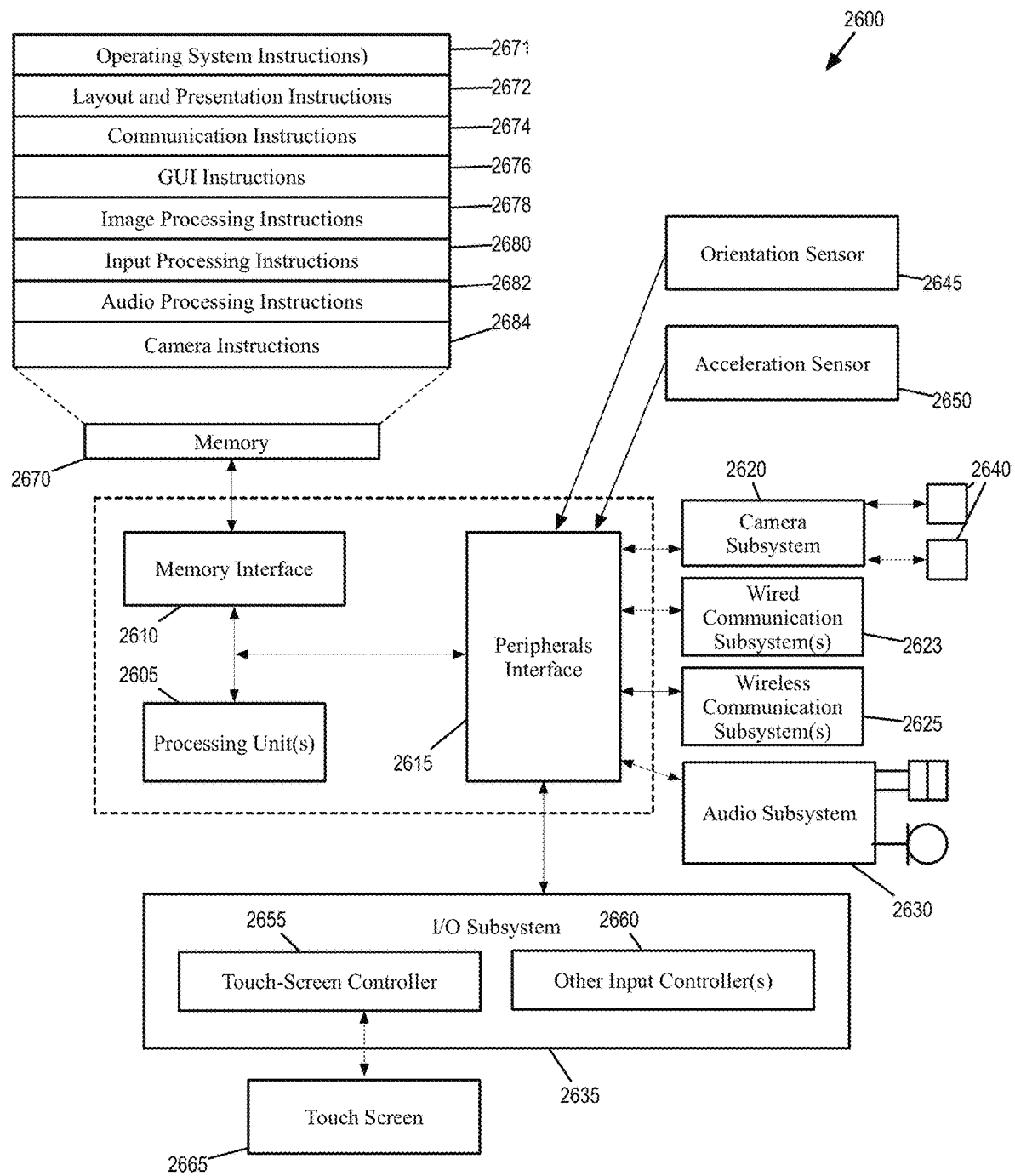
FIG. 26 is an example of an architecture of a mobile computing device.

The user data sharing of some embodiments occurs on mobile devices, such as smart phones (e.g., iPhones®) and tablets (e.g., iPads®). FIG. 26 is an example of an architecture 2600 of such a mobile computing device. As shown, the mobile computing device 2600 includes one or more processing units 2605, a memory interface 2610 and a peripherals interface 2615.

The peripherals interface 2615 is coupled to various sensors and subsystems, including a camera subsystem 2620, a wired communication subsystem(s) 2623, a wireless communication subsystem(s) 2625, an audio subsystem 2630, an I/O subsystem 2635, etc. The peripherals interface 2615 enables communication between the processing units 2605 and various peripherals. For example, an orientation sensor 2645 (e.g., a gyroscope) and an acceleration sensor 2650 (e.g., an accelerometer) is coupled to the peripherals interface 2615 to facilitate orientation and acceleration functions.

The camera subsystem 2620 is coupled to one or more optical sensors 2640 (e.g., a charged coupled device (CCD) optical sensor, a complementary metal-oxide-semiconductor (CMOS) optical sensor, etc.). The camera subsystem 2620 coupled with the optical sensors 2640 facilitates camera functions, such as image and/or video data capturing. The wired communication subsystem 2623 and wireless communication subsystem 2625 serve to facilitate communication functions.

In some embodiments, the wireless communication subsystem 2625 includes radio frequency receivers and transmitters, and optical receivers and transmitters (not shown in FIG. 26). These receivers and transmitters of some embodiments are implemented to operate over one or more communication networks such as a GSM network, a Wi-Fi network, a Bluetooth network, etc. The audio subsystem 2630 is coupled to a speaker to output audio (e.g., to output voice navigation instructions). Additionally, the audio subsystem 2630 is coupled to a microphone to facilitate voice-enabled functions in some embodiments.

The I/O subsystem 2635 involves the transfer between input/output peripheral devices, such as a display, a touch screen, etc., and the data bus of the processing units 2605 through the peripherals interface 2615. The I/O subsystem 2635 includes a touch-screen controller 2655 and other input controllers 2660 to facilitate the transfer between input/output peripheral devices and the data bus of the processing units 2605. As shown, the touch-screen controller 2655 is coupled to a touch screen 2665. The touch-screen controller 2655 detects contact and movement on the touch screen 2665 using any of multiple touch sensitivity technologies. The other input controllers 2660 are coupled to other input/control devices, such as one or more buttons. Some embodiments include a near-touch sensitive screen and a corresponding controller that can detect near-touch interactions instead of or in addition to touch interactions.

The memory interface 2610 is coupled to memory 2670. In some embodiments, the memory 2670 includes volatile memory (e.g., high-speed random access memory), non-volatile memory (e.g., flash memory), a combination of volatile and non-volatile memory, and/or any other type of memory. As illustrated in FIG. 26, the memory 2670 stores an operating system (OS) 2671. The OS 2671 includes instructions for handling basic system services and for performing hardware dependent tasks. The memory 2670 additionally includes layout and presentation instructions 2672 in order for the device 2600 to perform the layout generation and the presentation management operations of some embodiments. In some embodiments, these instructions 2672 may be a subset of the operating system instructions 2671, or may be part of the instructions for an application such as the reader application.

The memory 2670 also includes communication instructions 2674 to facilitate communicating with one or more additional devices (e.g., for peer-to-peer data sharing, or to connect to a server through the Internet for cloud-based data sharing); graphical user interface instructions 2676 to facilitate graphic user interface processing; image processing instructions 2678 to facilitate image-related processing and functions; input processing instructions 2680 to facilitate input-related (e.g., touch input) processes and functions; audio processing instructions 2682 to facilitate audio-related processes and functions; and camera instructions 2684 to facilitate camera-related processes and functions. The instructions described above are merely exemplary and the memory 2670 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 26 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 26 may be split into two or more integrated circuits.

B. Computer System

Figure 27:
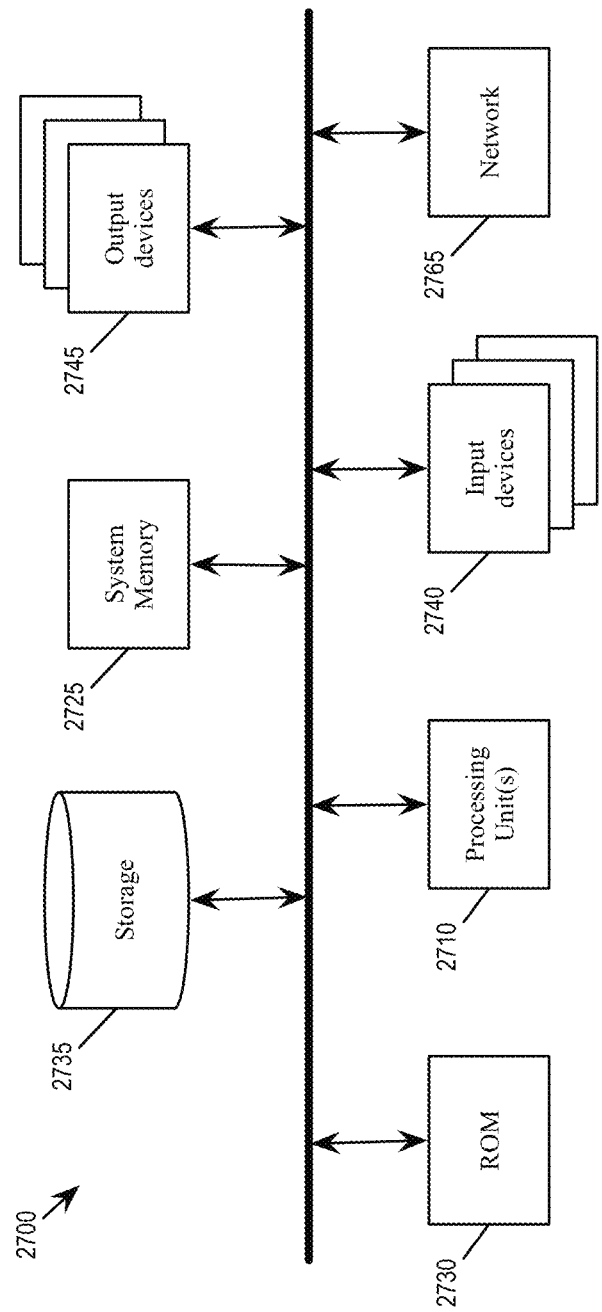
FIG. 27 conceptually illustrates an electronic system with which some embodiments of the invention are implemented.

FIG. 27 conceptually illustrates another example of an electronic system 2700 with which some embodiments of the invention are implemented. The electronic system 2700 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2700 includes a bus 2705, processing unit(s) 2710, a graphics processing unit (GPU) 2715, a system memory 2720, a network 2725, a read-only memory 2730, a permanent storage device 2735, input devices 2740, and output devices 2745.

The bus 2705 collectively represents all system, peripheral, and chipset buses that communicatively connect the numerous internal devices of the electronic system 2700. For instance, the bus 2705 communicatively connects the processing unit(s) 2710 with the read-only memory 2730, the GPU 2715, the system memory 2720, and the permanent storage device 2735.

From these various memory units, the processing unit(s) 2710 retrieves instructions to execute and data to process in order to execute the processes of the invention. The processing unit(s) may be a single processor or a multi-core processor in different embodiments. Some instructions are passed to and executed by the GPU 2715. The GPU 2715 can offload various computations or complement the image processing provided by the processing unit(s) 2710. In some embodiments, such functionality can be provided using CoreImage's kernel shading language.

The read-only-memory (ROM) 2730 stores static data and instructions that are needed by the processing unit(s) 2710 and other modules of the electronic system. The permanent storage device 2735, on the other hand, is a read-and-write memory device. This device is a non-volatile memory unit that stores instructions and data even when the electronic system 2700 is off. Some embodiments of the invention use a mass-storage device (such as a magnetic or optical disk and its corresponding disk drive, integrated flash memory) as the permanent storage device 2735.

Other embodiments use a removable storage device (such as a floppy disk, flash memory device, etc., and its corresponding drive) as the permanent storage device. Like the permanent storage device 2735, the system memory 2720 is a read-and-write memory device. However, unlike storage device 2735, the system memory 2720 is a volatile read-and-write memory, such a random access memory. The system memory 2720 stores some of the instructions and data that the processor needs at runtime. In some embodiments, the invention's processes are stored in the system memory 2720, the permanent storage device 2735, and/or the read-only memory 2730. For example, the various memory units include instructions for processing multimedia clips in accordance with some embodiments. From these various memory units, the processing unit(s) 2710 retrieves instructions to execute and data to process in order to execute the processes of some embodiments.

The bus 2705 also connects to the input and output devices 2740 and 2745. The input devices 2740 enable the user to communicate information and select commands to the electronic system. The input devices 2740 include alphanumeric keyboards and pointing devices (also called "cursor control devices"), cameras (e.g., webcams), microphones or similar devices for receiving voice commands, etc. The output devices 2745 display images generated by the electronic system or otherwise output data. The output devices 2745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 27, bus 2705 also couples electronic system 2700 to a network 2725 through a network adapter (not shown). In this manner, the computer can be a part of a network of computers (such as a local area network ("LAN"), a wide area network ("WAN"), or an Intranet), or a network of networks, such as the Internet. Any or all components of electronic system 2700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 8, 10, 16, 21, and 25) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method comprising:
   receiving an authored document comprising a content presentation structure (CPS) structuring the content of an article into a plurality of device agnostic components, each component having a role in the presentation of the authored document that is specified by a set of instructions, wherein the authored document is presentation device agnostic, not including information that is specific to any individual presentation devices, and is universally adapted for use with a plurality of electronic devices using a subset of device-specific rules stored on each of the plurality of electronic devices; and
   distributing the authored document to a first and a second of the plurality of electronic devices, wherein the distributed authored document enables a first electronic device of the plurality of electronic devices to present each component of the article based on (i) the CPS presentation role of the component in the article and (ii) a first subset of the device-specific rules specific to the first electronic device and wherein the distributed authored document enables a second electronic device of the plurality of electronic devices to present each component of the article based on (i) the CPS presentation role of the component in the article and (ii) a second subset of the device-specific rules specific to the second electronic device, wherein the first device specific rules are different than the second device specific rules.

2. The method of claim 1, wherein the set of instructions provides content presentation structure of the article.

3. The method of claim 2, wherein the set of instruction is written in JavaScript Object Notation (JSON) language.

4. The method of claim 1, wherein the set of instructions is a first set of instructions, wherein distributing the authored document comprises enriching the authored document with a second set of instructions.

5. The method of claim 4, wherein the second set of instructions comprises styling and layout information.

6. The method of claim 4, wherein the second set of instructions are provided by a template that can be applied to other authored documents.

7. The method of claim 4, wherein the second set of instructions comprises instructions for providing default values for a set of properties of the article that are not specified by the first set of instructions.

8. The method of claim 4, wherein the second set of instructions comprises instructions for obtaining resources necessary for presenting the article.

9. The method of claim 4, wherein the second set of instructions comprises information specific to different types of electronic devices.

10. The method of claim 1, wherein the set of instructions of the authored document comprises content provided by a content publisher.

11. The method of claim 1, wherein the set of instructions of the authored document specifies layout information in terms of display columns, wherein a horizontal display dimension of one of the electronic device's comprises less than ten columns.

12. The method of claim 1, wherein a particular component having a particular role exhibits a first behavior based on the particular role when the article is presented by the first electronic device and exhibits a second, different behavior based on the particular role when the article is presented by the second electronic device.

13. The method of claim 1, wherein each electronic device is running a reader application for determining the presentation of each component of the article according to the set of instructions.

14. The method of claim 1, wherein features specific to a device comprise the device's display dimensions.

15. A device comprising:
a display screen,
a non-transitory machine readable medium storing a program for presenting an article at the display screen, the program comprising sets of instructions for:
  receiving an authored document comprising a content presentation structure (CPS) for structuring content of an article into a plurality of device agnostic components, each component is assigned a role in the presentation of the authored document that is specified by a set of instructions, wherein the authored document is presentation device agnostic, not including information that is specific to any individual presentation devices, and is universally adapted for use with a plurality of electronic devices using a subset of device-specific rules stored on each of the plurality of electronic devices; and
  distributing the authored content to a first and a second of the plurality of electronic devices, wherein the distributed authored document enables a first electronic device of the plurality of electronic devices to present each component of the article according to (i) the component's assigned role, wherein the assigned role of an image component determines cropping and resizing of the image component for display and (ii) a first subset of the device-specific rules specific to the first electronic device and wherein the distributed authored document enables a second electronic device of the plurality of electronic devices to present each component of the article based on (i) the CPS presentation role of the component in the article and (ii) a second subset of the device-specific rules specific to the second electronic device, wherein the first device specific rules are different than the second device specific rules.

16. The device of claim 15, wherein an image component assigned a role for showing a face is cropped and resized based on a position and a size of the face within the image.

17. The device of claim 15, wherein an image component assigned a role for showing a figure is resized to fit a layout allocated for the image component but not clipped.

18. The device of claim 15, wherein an image component assigned a role for showing a photograph is cropped and resized to fit a layout allocated for the image component.

19. The device of claim 15, wherein the cropping is based on an aspect ratio of the image.

20. A method comprising:
receiving an authored document comprising a first content presentation structure (CPS) for structuring the content of an article into a plurality of device agnostic components, each component having a role in a presentation of the authored document that is specified by a set of instructions, wherein the authored document is presentation device agnostic, not including information that is specific to any individual presentation devices, and is universally adapted for use with a plurality of electronic devices using a subset of device-specific rules stored on each of the plurality of electronic devices;
elaborating the first content presentation structure on a first of the plurality of electronic devices by elaborating each object of the first content presentation structure, wherein elaborating an object comprises providing resources for presenting the object that are in addition to information provided by the first content presentation structure, wherein the resources provided are based on (i) the CPS presentation role of the component in the article and (ii) a first subset of the device-specific rules specific to a first electronic device of the plurality of electronic devices;
storing the gathered resources for the components in a second content presentation structure; and
distributing the second content presentation structure to a second electronic device of the plurality of electronic devices, wherein the second content presentation structure enables the second electronic device to present each component of the article based on (i) the CPS presentation role of the component in the article and (ii) a second subset of the device-specific rules specific to the second electronic device, wherein the first device specific rules are different than the second device specific rules.

21. The method of claim 20, wherein storing the gathered resources as the second content presentation structure comprises optimizing the second content presentation structure to reduce its size.

22. The method of claim 20, wherein different types of the electronic devices comprise electronic devices with different display dimensions, wherein elaborating an object having an image comprises producing different versions of the image for different possible display dimensions.

23. The method of claim 20, wherein the object can be a component or a property of the component.

24. The method of claim 23, wherein elaborating a property of a component comprises providing a default value for the property.

25. The method of claim 20, wherein elaborating the object having text comprises gathering fonts for the text.

\* \* \* \* \*